(12) United States Patent
Harper et al.

(10) Patent No.: US 7,643,974 B2
(45) Date of Patent: Jan. 5, 2010

(54) PIPELINE OPTIMIZER SYSTEM

(75) Inventors: Charles N. Harper, Houston, TX (US); Michael T. Boczon, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 544 days.

(21) Appl. No.: 11/279,554

(22) Filed: Apr. 12, 2006

(65) Prior Publication Data
US 2006/0241924 A1 Oct. 26, 2006

Related U.S. Application Data

(60) Provisional application No. 60/673,831, filed on Apr. 22, 2005.

(51) Int. Cl.
G06F 9/455 (2006.01)
(52) U.S. Cl. .............. 703/7; 703/6; 703/9; 406/12
(58) Field of Classification Search ............... 703/7, 703/6, 9, 13; 702/32; 713/401; 435/6; 406/12; 707/200; 717/104; 709/223
See application file for complete search history.

(56) References Cited

U.S. PATENT DOCUMENTS

| | | | |
|---|---|---|---|
| 6,374,202 B1 * | 4/2002 | Robinson | 703/13 |
| 6,827,528 B1 * | 12/2004 | Relin | 406/12 |
| 2002/0042700 A1 * | 4/2002 | Giles et al. | 703/6 |
| 2004/0059955 A1 * | 3/2004 | Takahashi et al. | 713/401 |
| 2004/0060037 A1 * | 3/2004 | Damm et al. | 717/104 |
| 2004/0081977 A1 * | 4/2004 | Hsu et al. | 435/6 |
| 2005/0038825 A1 * | 2/2005 | Tarabzouni et al. | 707/200 |
| 2005/0132030 A1 * | 6/2005 | Hopen et al. | 709/223 |
| 2005/0137810 A1 * | 6/2005 | Esposito | 702/32 |
| 2005/0149581 A1 * | 7/2005 | Gupta | 707/200 |

FOREIGN PATENT DOCUMENTS

FR 2818742 6/2002

OTHER PUBLICATIONS

Taware et al., "Dynamic linear finite element model for pressure prediction in a gas pipeline", IEEE 1999.*
Morley et al., "GAnet: genetic algorithm platform for pipe network optimization", Advances in Engineering softwaer, 2001.*
Goldberg et al., "Genetic algorithms for pipeline optimization", ASCE, Journal of Computing in Civil Engineering, 1987.*

(Continued)

Primary Examiner—Paul L Rodriguez
Assistant Examiner—Kandasamy Thangavelu
(74) Attorney, Agent, or Firm—Donna Blalock Holguin

(57) ABSTRACT

One embodiment of the invention provides a method for optimizing a variety of aspects of pipeline operations by using a genetic algorithm. Generally, the genetic algorithm is used to evolve a population of feasible solutions over successive generations until a termination condition is satisfied. Each solution specifies a feasible operational state of the pipeline system. Over successive generations existing solutions are modified, and an identified solution in the population is removed at each successive generation. Over repeated generations, the solutions in the population improve. Once an optimized production solution is generated, an optimized pressure solution may be generated using a direct pressure optimization process.

39 Claims, 13 Drawing Sheets

OTHER PUBLICATIONS

Reis et al., "Optimal location of control valves in pipe networks by genetic algorithm", Journal of Water Resources Planning and Management, 1997.*

Maier et al., "Ant colony optimization for design of water distribution systems", Journal of Water Resources Planning and Management, 2003.*

Van Zyl et al., "Operational optimization of water distribution systems using a hybrid genetic algorithm", Journal of Water Resources Planning and Management, 2004.*

Viaravamoorthy et al., "Optimal design of water distribution systems using genetic algorithms", Computer aided Civil and Infrastructure Engineering, 2000.*

Goldberg, R., "Computer aided gas pipeline operation using Genetic Algorithm and Rule learning", Ph. D dissertation submitted to the University of Michigan, 1983.*

Lingireddy et al., "Hydraulic network calibration using Genetic Algorithm", University of Kentucky; 2002.*

Savic et al., "An evolution program for optimal pressure regulation in water distribution networks", Engineering Optimization, 1995.*

Air Liquide Pipeline Optimizer Specifications Document, NuTech Solutions, Inc., David Davis, et al., pp. 1-101.

Silva, A.C., et al.; "Using Genetic Algorithm and Simplex Method to Stabilize an Oil Treatment Plant Inlet flow" ASME—International Pipeline Conference 2000. vol. 2, Oct. 1, 2000; Retrieved from Internet: http://publica.fhg.de/documents/N-2938.html [retrieved on Dec. 4, 2007] abstract.

Li, Q., et al., "Solving Natural Gas Loadflow Problems using Electric Loadflow Techniques," Proceedings of the North American Power Symposium, Oct. 20, 2003, retrieved from Internet: http://power.ecen.okstate.edu/gedra/gas_loadflow_naps2003.pdf [retrieved on Dec. 4, 2007] 7 pgs.

Mantovani, J.R.S., et al., "VAr Planning Using Genetic Algorithm and Linear Programming" IEE Proceedings on Generation, Transmission and Distribution, vol. 148, Issue 3, May 2001, Retrieved from Internet: URL: HTTP://ieeexplore.ieee.org/xpl/greeabs_all.jsp?tp=&arnumber=926426&isnumber=20037, [retrieved on Dec. 4, 2007] abstract.

PCT/IB2006/000909 International Search Report, mailed Sep. 5, 2007, pp. 1-4.

Andriano C. Silva, et al, "Using Genetic Algorithm and Simplex Method to Stabilize an Oil Treatment Plant Inlet Flow," Proceedings of IPC (2000), The International Pipeline Conference, Oct. 1-5, 2000, pp. 1-8.

Communication Pursuant to Article 94(3) EPC for Application No. 06744509.8, dated Apr. 6, 2009.

* cited by examiner

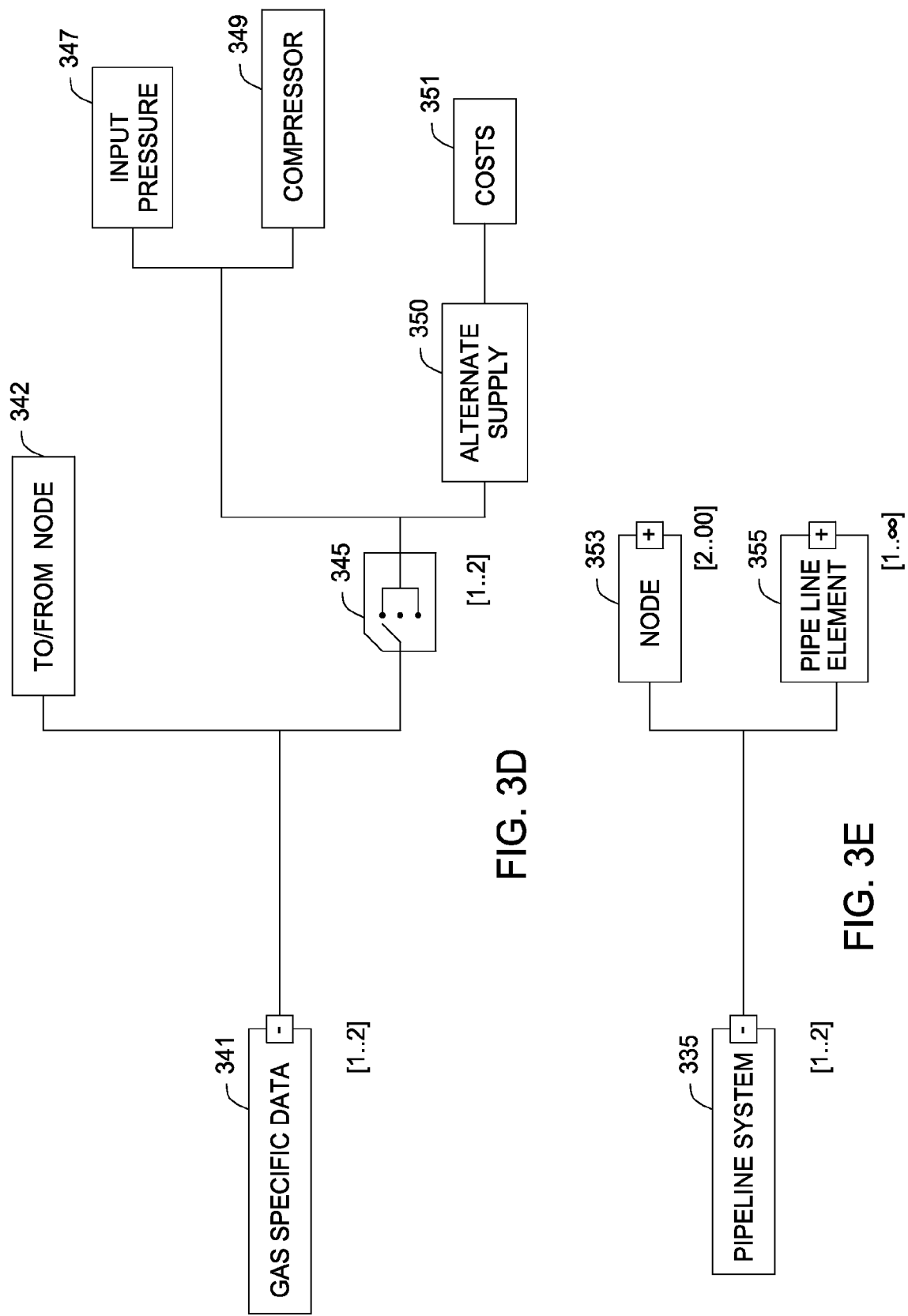

PIPELINE OPTIMIZER SYSTEM

CROSS-REFERENCE TO RELATED APPLICATIONS

This application claims the benefit under 35 U.S.C. § 119(e) to provisional application No. 60/673,831, filed Apr. 22, 2005, the entire contents of which are incorporated herein by reference.

BACKGROUND

Generally, a pipeline system provides a continuous pipe conduit, complete with equipment such as valves, compressor stations, communications systems, and meters, for transporting liquid or gaseous materials from one point to another, usually from one point (or points) of production or processing to another, or to points of use. For example, FIG. 1 illustrates a dual-pipeline system that includes both a gaseous nitrogen pipeline running in parallel to a gaseous oxygen pipeline. A number of plants are shown at various locations along the pipeline route, at which air separation units, compressors, boosters, regulators, and other equipment elements operate to introduce material into the pipeline.

Optimizing the operations of a pipeline system, such as the one shown in FIG. 1, is a complex task. In particular, optimizing a pipeline system to account for power costs of various nodes, for reconfigurable elements (e.g., a pipeline element that can act to increase pressure or flow, or decrease pressures or flows at a particular node of the pipeline), and for contractually obligated output and pressure requirements and at various nodes, has proven to be a difficult task. Commercially-available pipeline optimization systems have been generally unable to provide satisfactory solutions for configuring complex pipeline systems. In particular, commercially-available pipeline optimization systems have been unable to account for the variety of factors that may impact on the operational cost of operating the pipeline. For example, currently available optimization systems have not accounted for a pipeline system configured to transport more than one material (e.g., dual-pipeline system shown in FIG. 1); they have not accounted for all the features of client contracts (e.g., both "take or pay contracts" from the production side of pipeline operations and minimum pressure/flow rates from the delivery side of pipeline operations); and they did not optimize the configuration of reconfigurable network elements. Instead, such systems often constrain a variety of these variables and seek to optimize an isolated aspect of pipeline operation, assuming that the others may be optimized independently. Often, this has lead to sub-optimal solutions. Moreover, even when current systems have proven capable of identifying a highly-quality solution, they often fail to do so in a reasonable amount of time.

Accordingly, there remains a need for techniques for optimizing the operations of a pipeline system. Typically, the optimization process should be used to identify an allowable state of pipeline operations that satisfies any operational requirements, physical abilities, and that minimizes operational costs, most notably power consumption.

SUMMARY

In one embodiment, the present invention relates to simulating and optimizing the operations of a pipeline. One embodiment of the invention includes a method for optimizing the operations of a pipeline system. The method generally includes, reading input data, wherein the input data describes the pipeline system to be optimized and generating a population of solutions, wherein each solution in the population specifies a feasible operational state for the pipeline system. The method generally further includes performing a genetic optimization process on the population until a termination condition specified by the input data is satisfied and selecting an optimized production solution with a best evaluation, relative to the solutions in the population.

Once an optimized production solution is generated, the method generally further includes generating, for the optimized production solution, an optimized pressure solution specifying an output pressure present at one or more delivery points of the pipeline system and an input pressure at one or more production nodes of the pipeline system, using a direct pressure optimization process.

Performing the genetic optimization process generally includes modifying at least one aspect of the feasible operational state specified by at least one of the solutions in the population, simulating the operation of the pipeline system, according to the operational state specified by the modified solution, and evaluating the performance of the modified solution. The optimization process generally further includes adding the modified solution to the population and removing a solution from the population with the worst evaluation.

In a particular embodiment, the initial population of solutions may include a first group of solutions and a second group of solutions. Generally, the first group of solutions may be generated according to heuristic rules, and the second group of solutions may be generated using a random process.

In a particular embodiment, modifying at least one aspect of the feasible operational state specified by a solution may generally include selecting a solution modification technique, and selecting at least one solution from the population to modify according to the selected solution modification technique.

Any number of solution modification techniques may be used. For example, one solution modification technique includes randomly modifying a solution in the population, another technique includes modifying a solution based on a heuristic rule, and a third technique includes cross-breeding two or more solutions. Additionally, because input data may be related to a real-world pipeline system as it is being used, the input data may come from a system status database describing the current real-world operational state of the pipeline system. The input data may be provided in a structured form, such as the widely used extensible markup language (XML) used for describing data.

Another embodiment includes a method of optimizing the operations of a pipeline system. The method generally includes generating an optimized production solution for the production of material supplied to the pipeline system using a genetic algorithm optimization technique to optimize a population of seed solutions. The genetic algorithm optimization technique may be configured to optimize the population of seed solutions to generate the optimized production solution according to the techniques described above. The method generally further includes generating, for the optimized production solution, an optimized pressure solution specifying an output pressure present at one or more delivery points of the pipeline system and an input pressure to generate at one or more production nodes of the pipeline system, using a direct pressure optimization technique.

In a particular embodiment, the output pressure for the one or more delivery points are within a required minimal delivery pressure for each respective delivery point and a maximal input pressure allowed for each respective production node of the pipeline system.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIGS. 3A-3G illustrate a hierarchal collection of data elements used to model aspects of a pipeline system to be optimized, according to one embodiment of the invention;

DESCRIPTION OF PREFERRED EMBODIMENTS

Figure 1:
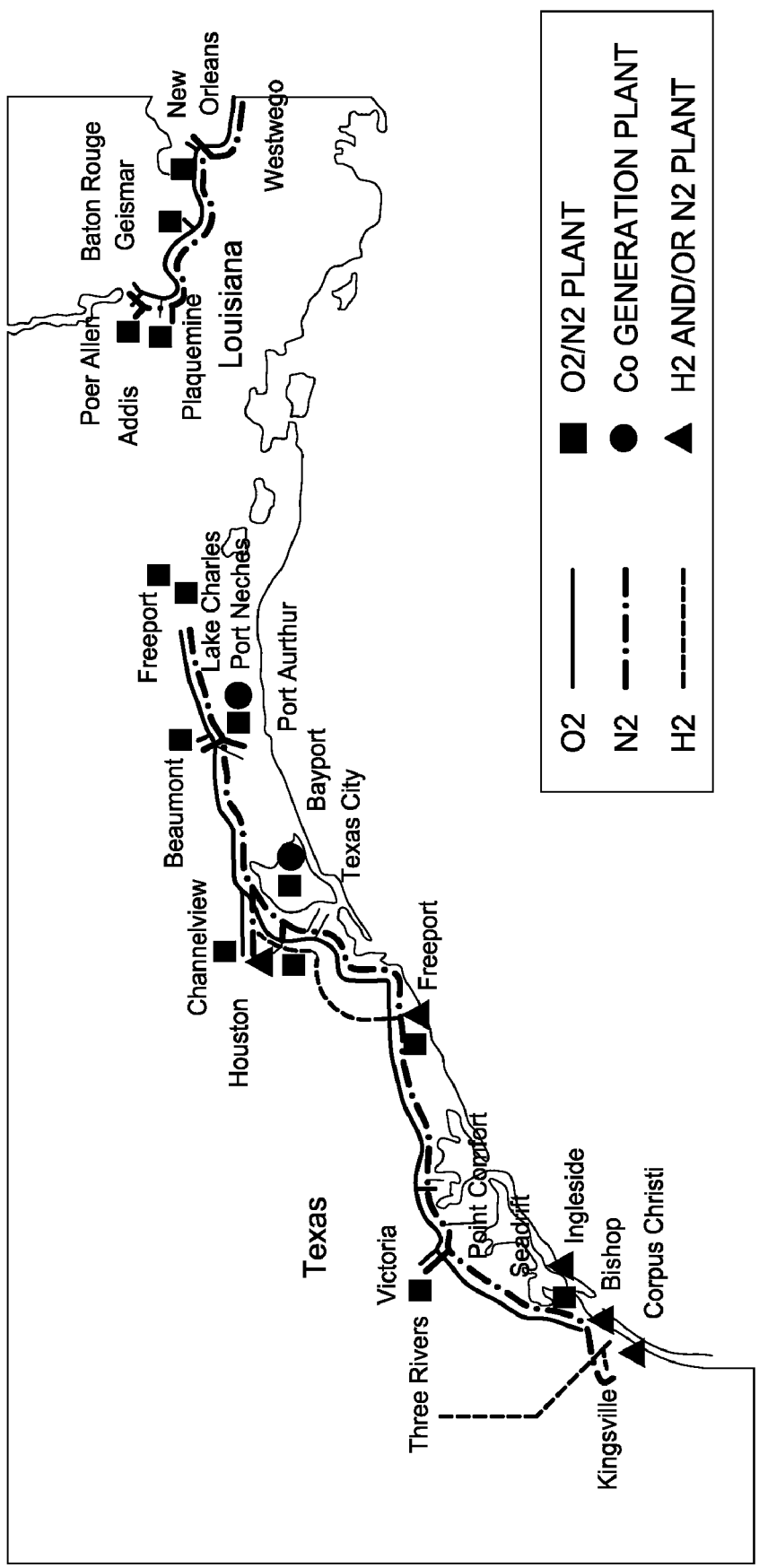
FIG. 1 is a map illustrating an existing pipeline system.

Embodiments of the invention provide a computerized optimization system that may be used to optimize a variety of aspects of pipeline operations. Generally, the term "optimization" is used herein to describe a change in the state of pipeline operation that is superior to other states, usually in terms of power or other operating costs. Embodiments of the invention provide an optimization system that may be used to identify low-cost solutions to the problem of satisfying pipeline operational constraints. Note, however, embodiments of the present invention are not required to identify an optimal, or best, solution to pipeline configuration. Instead, the term optimization generally refers to finding acceptable solutions to difficult problems, in a reasonable amount of time.

In one embodiment, the optimization system is a software application configured to search for a high-quality solution to an optimization problem. In the case of a pipeline system, the optimization system searches for equipment settings and configurations that satisfy the customer and operational requirements, while also minimizing power costs.

Examples of optimizations that may be identified or generated by the optimization system include: the reduction of power costs by shifting production among different plants, optimization of compressor settings, configuration of pipeline elements that may perform multiple functions, and satisfaction of constraints on system operations. Thus, the optimization system may be used to minimize the power costs required to operate a pipeline while also providing contractually obligated outlet pressures (material flow) to customers located at various nodes of the pipeline.

In one embodiment, operational constraints may include both "hard" constraints and "soft" constraints. A hard constraint is a requirement that a solution to an optimization problem must satisfy if the solution is to be regarded as feasible. For example, a solution may deliver product to clients at required pressures, while exceeding a hard constraint on maximum pressure in any part of the pipeline. Violating a hard constraint makes a solution infeasible. Additional examples of hard constraints include: minimum and maximum pressures and flows through segments of a pipeline, maximum valve openings on regulators, a constraint requiring a plant to be on or off, and physical limits on compressor models.

A soft constraint is a constraint on pipeline performance that it is desirable to satisfy, but satisfying it is not required in order for a solution to be feasible. For example, a soft constraint might be to reduce venting of gases at plants. There are many situations in which venting must occur, but as long as venting does not invalidate a solution, the requirement that venting be minimized is a soft, rather than hard, constraint. Another example of a soft constraint is a "take-or-pay" agreement where a pipeline operator must pay for available product or materials, whether used or not. In the case of a soft constraint, if other efficiencies of a particular pipeline configuration compensate for an incurred penalty, then such a configuration may be acceptable, or even preferred.

Embodiments of the invention are described herein relative to the operation of a dual-pipeline network configured to transport both gaseous oxygen (GOX or $O_2$) and gaseous nitrogen (GAN or $N_2$). That is, embodiments of the invention are described relative to the pipeline system shown in the map of FIG. 1. However, those of ordinary skill in the art will recognize that embodiments of the present invention may be adapted to optimizing pipeline operations for pipeline networks configured to transport more (or fewer) than two materials, including materials other than $O_2$ or $N_2$.

Figure 2:
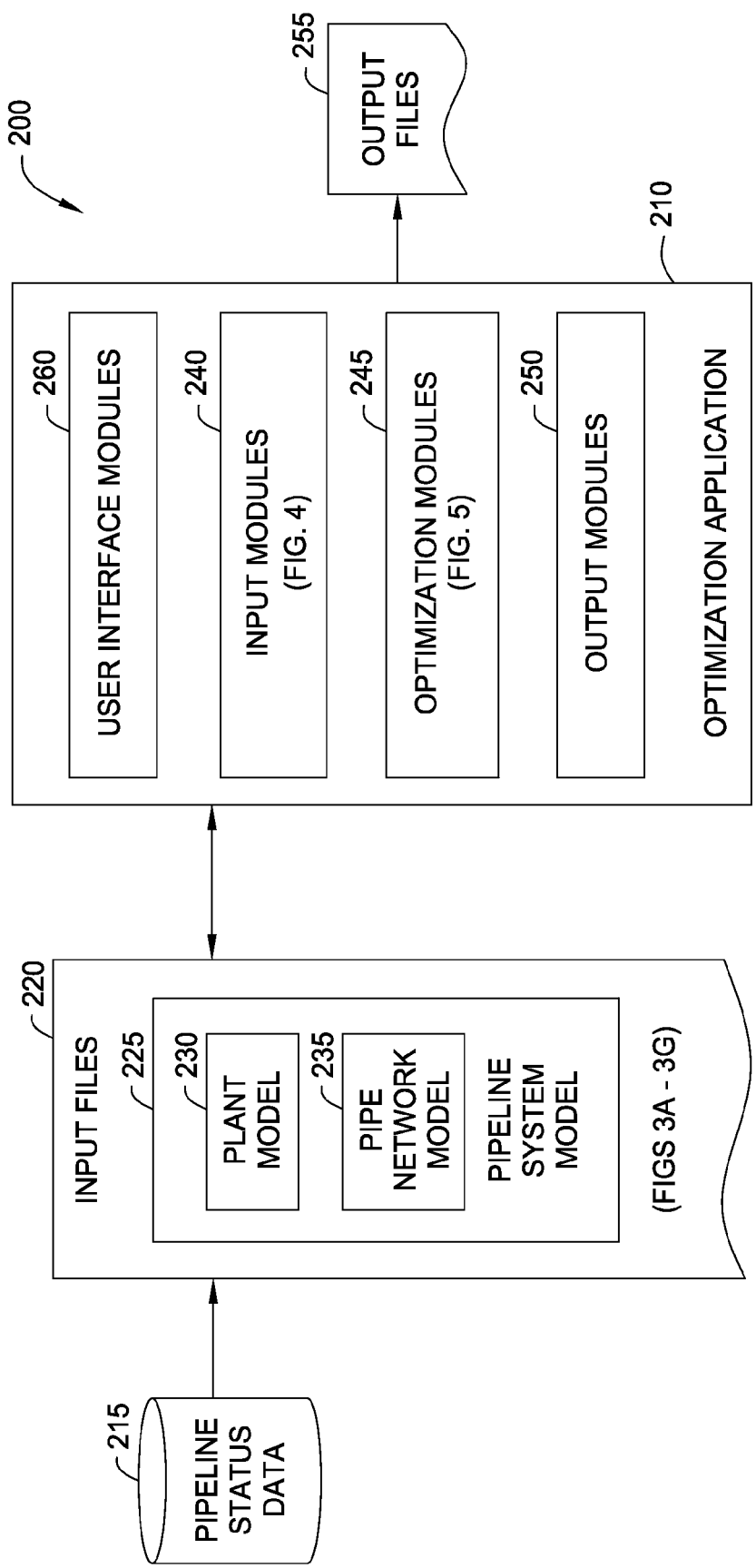
FIG. 2 illustrates system used for optimizing operational aspects of a pipeline system, according to one embodiment of the invention.

FIG. 2 is a block diagram illustrating a system 200 used for optimizing operational aspects of a pipeline system, according to one embodiment of the invention. Generally, the components illustrated in system 200 may be implemented as computer software applications configured for existing computer systems, e.g., desktop computers, server computers, laptop computers, tablet computers, and the like. The software applications described herein, however, are not limited to any particular computing system and may be adapted to take advantage of new computing systems as they become available. Further, the system 200 may be adapted for use in multi-processing environments such as a system with multiple CPUs and with distributed and parallel systems such as computing clusters or grids.

Additionally, the software applications illustrated in system 200 may be executing on distributed systems communicating over computer networks including local area networks or large, wide area networks such as the Internet. Also, in one embodiment, components of system 200 may be provided as an application program (or programs) stored on computer readable media such as a CD-ROM, DVD-ROM, flash memory module, or other tangible storage media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

As shown, system 200 includes an optimization application 210, a pipeline status database 215, input files 220 and output files 255. Input files 220 may include a pipeline system model 225 describing the pipeline to be optimized, pipeline constraints, optimization goals, and parameters for the optimization process. This information may also include the current status of different plants, compressor settings, the current configuration of multifunction pipeline elements, etc. Illustratively, pipeline system model 225 includes a pipeline network model 235 and plant models 230. Pipeline network model 235 describes the topology of a pipeline system to be optimized, and plant models 230 describe one or more production plants connected to the pipeline system described by pipeline system model 235. In the pipeline system illustrated in FIG. 1, plants may contain an air separation unit (ASU), vaporizers and compressors that increase the pressure and flow of gas into the pipeline. For other pipeline networks, of course, other elements may be used to introduce material and pressure into a pipeline.

In one embodiment, pipeline system model 225 may be composed using extensible markup language (XML). XML is a widely used standard for creating markup languages used to describe the structure of data. XML allows an author to define their own markup tags and document structure. Additionally, a variety of XML file viewers and editors are commercially available. Using such editors, a user may create, save and modify pipeline system model 225. FIGS. 3A-3G further illustrate elements of plant models 230 and pipe network model 235 using an exemplary XML grammar.

Pipeline status database 215 provides information regarding a current operational state of a pipeline system. In one embodiment, input files 220 may be generated using information obtained from the pipeline status database 215. In other words, pipeline system model 225 may reflect the actual operational status of an existing pipeline (e.g., the pipeline system shown in FIG. 1). Alternatively, users may define a variety of hypothetical pipeline topologies and configurations. Doing so allows the system 200 to be used to perform "what-if" analyses of potential changes to an existing pipeline. For example, users may create a pipeline system model 225 to study of the benefits obtainable by upgrading equipment, to study of the costs of adding a new customer, and to study of the benefits of adding a new facility, among other things.

Optimization application 210 may be configured to identify a high-quality solution to the configuration of the pipeline system described by input files 220. Such a solution may specify a setting for each configurable element of the pipeline system and the solution may also satisfy the operational constraints specified by input files 220. In one embodiment, optimization application 210 includes a number of modules configured to perform different functions related to the optimization process. As shown, the optimization application 210 includes an input module 240, a user interface module 260, an optimization module 245, and an output module 250.

User interface module 260 allows a user to interact with the optimization application 210. For example, user interface modules 260 may provide a graphical user interface (GUI) that allows graphical editing of the pipeline network model 235, plant models 230, the parameters associated with the pipeline components and also allows users to inspect optimization results. Aspects of the input module 240 are further described in reference to FIG. 4.

Optimization module 245 may be configured to perform an optimization run using input files 220. In one embodiment, the output of an optimization run is the best solution to pipeline configuration identified by the optimization modules 245, given the time and other constraints included in input files 220. Aspects of the optimization module 245 are further described in reference to FIG. 5. Output module 250 may be configured to process the results of an optimization run performed by optimization modules 245. For example, output modules 250 may be configured to generate a number of reports presented to the user (e.g., output files 255) that present the results of a given optimization run.

In one embodiment, the output modules 250 are configured to generate an XML file describing the best solution found during an optimization run, along with an evaluation of that solution. For example, optimization modules 245 may generate a summary file describing how much time the run took, what optimization parameters were used, what are pipeline systems were included in the input files 220, etc., and any unusual conditions or suspected data errors that occurred during the optimization run.

FIGS. 3A-3G illustrate a hierarchal collection of data elements used to model aspects of a pipeline system to be optimized, according to one embodiment of the invention. As shown, these figures provide a graphical representation of an exemplary XML grammar for describing a pipeline system model 225. The data elements in FIGS. 3A-3G are tailored to represent the pipeline system illustrated in FIG. 1. Those skilled in the art will recognize, however, that an XML grammar may be defined to describe any number of different pipeline systems. As such, the specific XML elements described below are provided as an example of an embodiment of system model 225, and different XML elements may be defined for other pipeline systems. Also, as is known, an XML document organizes data elements in a hierarchical structure, beginning from a single root element. Each element may include one or more sub-elements, and/or attributes. In FIGS. 3A-3G each element is represented as a labeled box that may be expanded to display any sub elements.

Figure 3A:
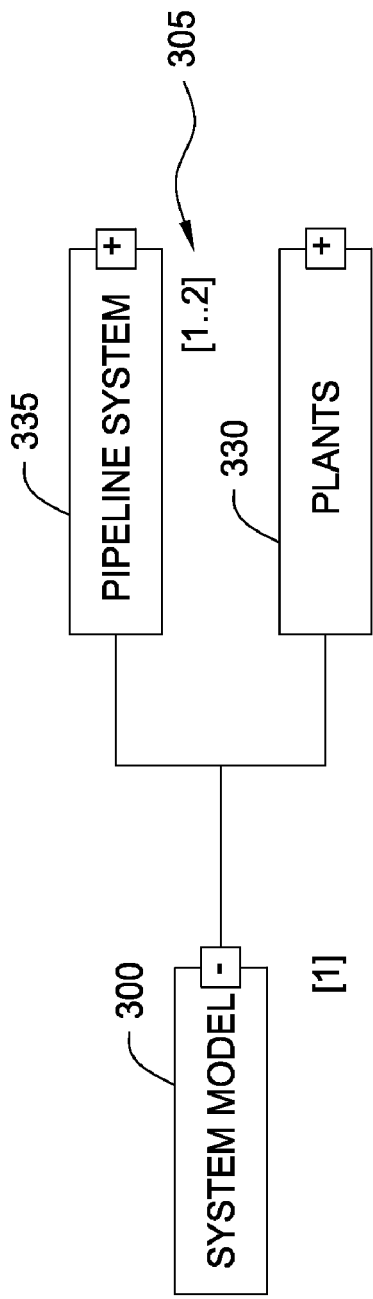
Figure 3B:
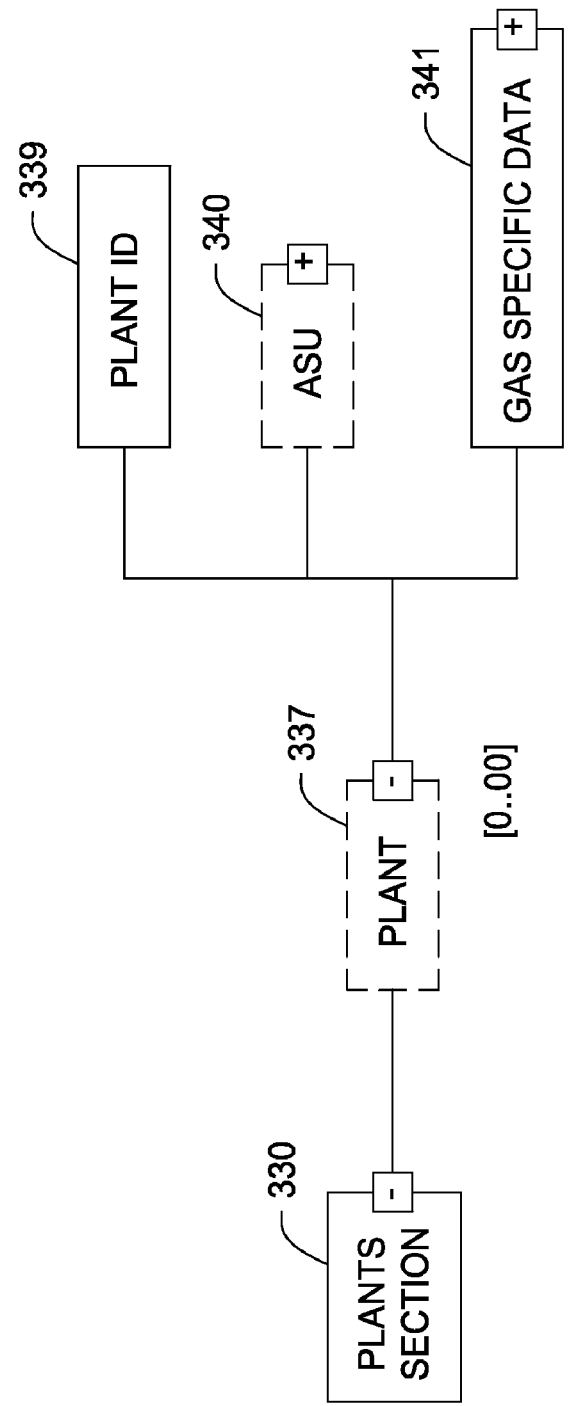
Figure 3C:
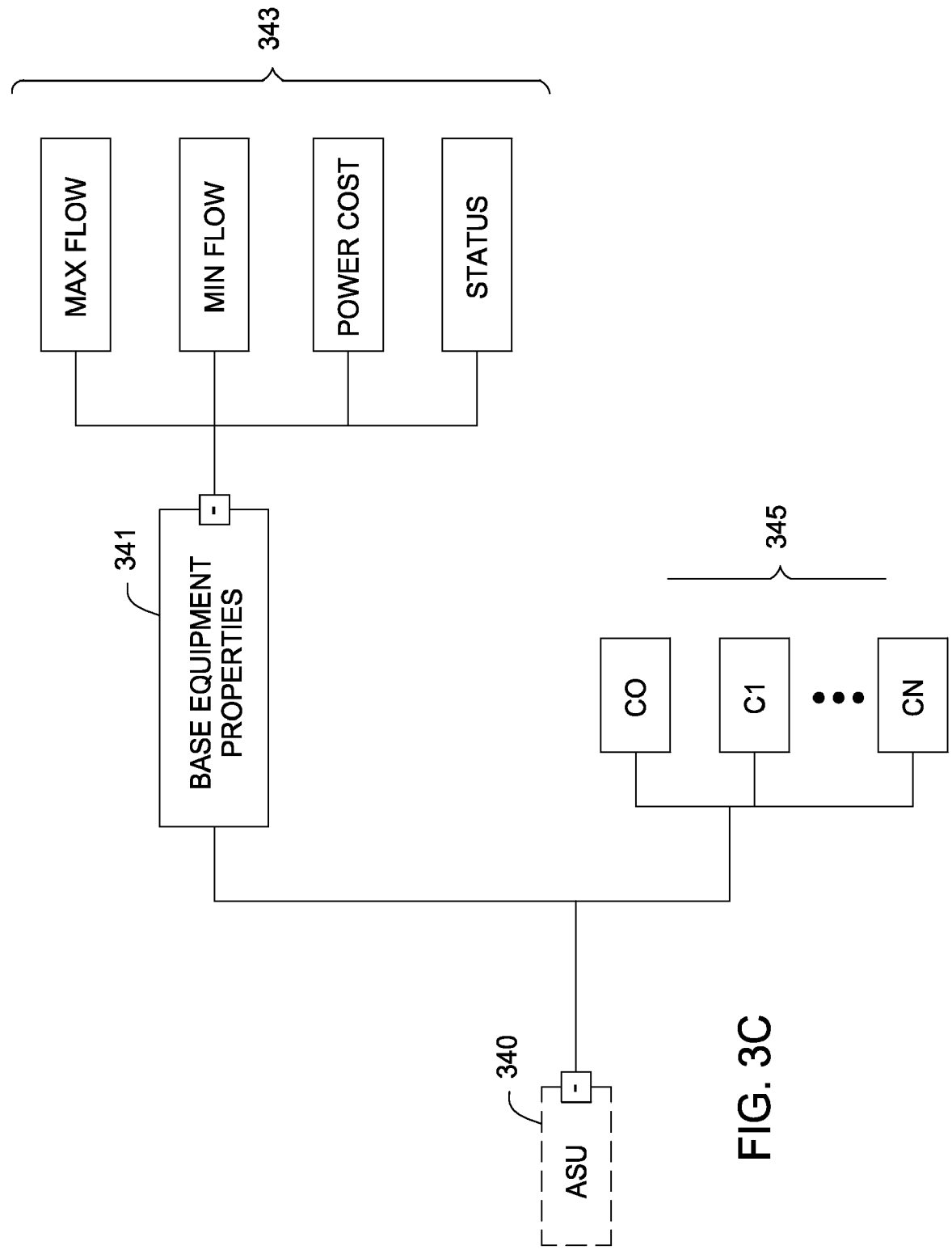

First, FIG. 3A shows a root element of an exemplary XML grammar beginning from pipeline system model 300. The pipeline system model 300 includes two sub-elements, a pipeline system 335 and a plants element 330. Expansion boxes on the left of pipeline system 335 and a plants element 330 indicate that these data elements may include sub-elements. Additionally, range data 305 may indicate any restrictions on the number of elements of a given type in a given system model 300. Thus, in this example, a data model of a pipeline includes a single system model 300 (i.e., a single root element), one or two pipeline system elements 335, and may include any number of plants element elements 330. FIGS. 3B-3D further illustrate the plants element 330, and FIGS. 3E-3G further illustrate the pipeline system element 335.

FIG. 3B further illustrates plants element 330. As shown, the plants element 330 includes a plant element 337. The plant element 337 may represent an actual (or contemplated) production plant where material is generated and inserted into a pipeline. A plants element 330 may include any number of plant elements 337, representing the plants in a given data model. The dashed lines of plant element 337 are used to indicate this element is not required for a valid system model 300. In other words, a system model element 300 may be created that does not include any plant elements 337. As shown, each plant element 337 includes a plant ID 339 and gas specific data 341. Additionally, each plant element 337 may include sub elements representing an air separation unit (ASU) 340. Generally, an ASU is a piece of equipment used to refine and obtain $O_2$ or $N_2$ from the atmosphere.

FIG. 3C illustrates sub-elements that may be specified for ASU element 340, according to the exemplary XML grammar being described. As shown, ASU element 340 includes base equipment properties 341. In this example, base equipment properties 341 includes sub elements 343 for specifying describing the maximum flow, minimum flow, power cost and operational status of an ASU 340. Additionally, an ASU 340 may include a set of coefficients 345 used to describe in a power equitation representing an ASU 340. As described in greater detail below, these coefficients may be used in both a simulation phase and a optimization phase of a pipeline system model 225.

FIG. 3D illustrates the sub-elements that may be specified for the gas-specific data element 341 as part of the exemplary XML grammar being described. As shown, gas-specific data element 341 includes a node element 342. This element of the data model may be used to indicate a node of the pipeline system where the output of the plant enters the pipeline system. Nodes are further described as an element of pipeline system 335, in conjunction with FIG. 3E. Symbol 345 indicates that an instance of gas-specific data element 341 in a data model may include elements from one of the two branches (or from neither of the two branches). In this example, gas-specific data element 341 may include an input pressure element and a compressor model 349 or an alternate supply element 350 and costs element 351. The upper branch includes data elements for input pressure element 347 and for a compressor element 349 used to describe the characteristics of the equipment used by a given air separation unit. The lower branch illustrates an alternate supply source. In some cases, material may be purchased and included in the pipeline. In such a case, the alternate supply element 350 and costs element 351 describes characteristics of an alternate supply. For example, an alternate supply element 350 may describe a "take or pay" source of supply, where the pipeline operator pays for product, whether actually used by the pipeline or not. As shown, the alternate supply element 350 as a sub-element of the plants 330, however, alternate supply element 350 may be a sub-element of the pipeline system element 335.

FIG. 3E illustrates the top-level structure of a pipeline system element 335 as part of the exemplary XML grammar being described. As shown, a pipeline system model 300 may include either one or two pipeline system elements 335. The presence of two pipeline systems 335, for example, corresponds to the pipeline illustrated in FIG. 1 that includes both a GOX pipe network and a GAN pipe network. Thus, to fully model this real-world pipeline system, pipeline system model 300 includes two pipeline system elements 335, one for the GOX pipe network and the GAN pipe network. Further, each pipeline system element 335 typically includes at least one pipe element 355 and two node elements 353. In other words, the simplest pipeline system 335 includes a single pipe element 353 connecting two node elements 353.

Figure 3F:
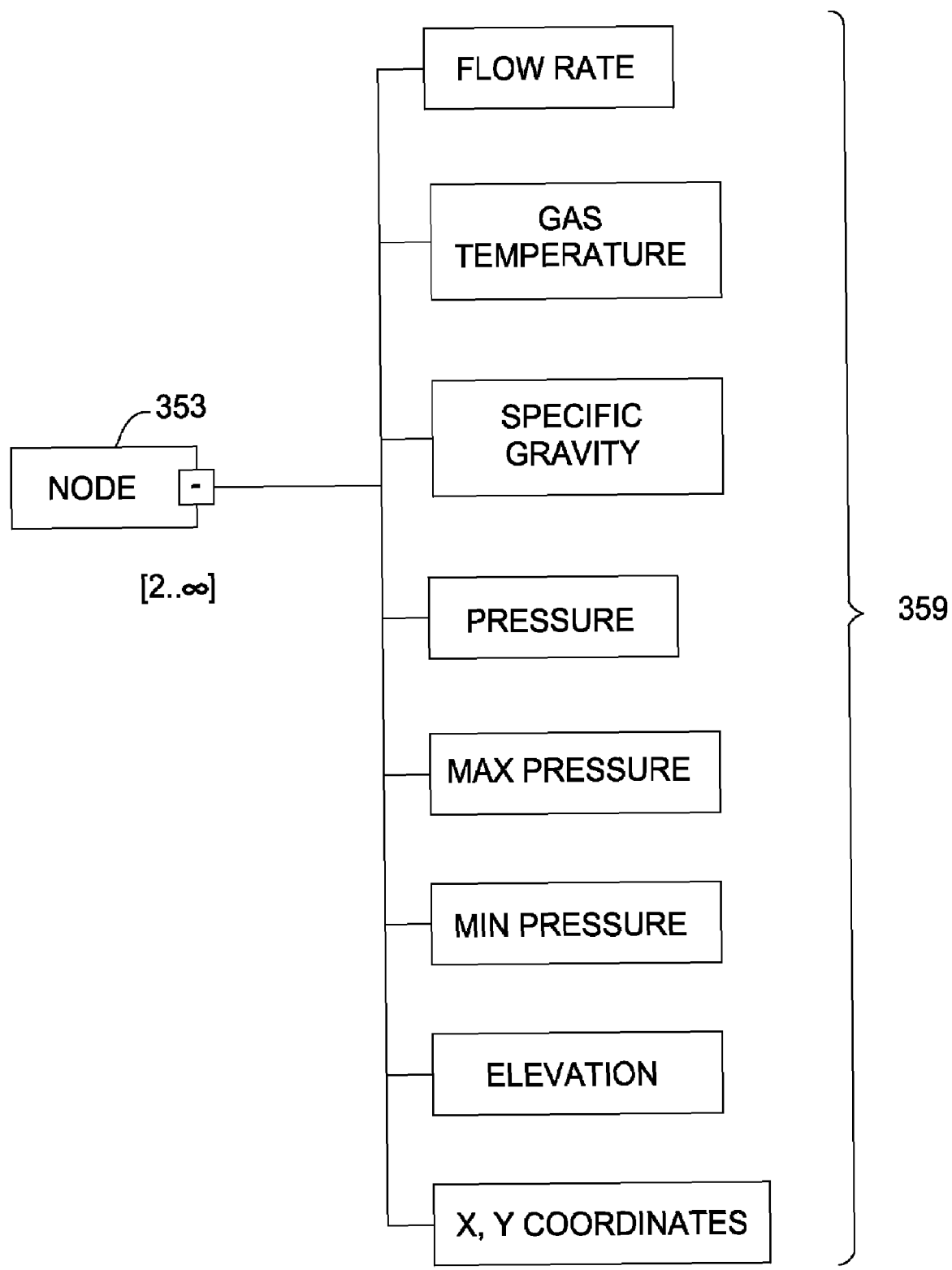

FIG. 3F illustrates the sub-elements of a node element 353 as part of the exemplary XML grammar being described. In one embodiment, a node element 353 may be characterized by a variety of data elements. As shown, a node element 353 includes elements 359 describing the flow rate, gas temperature, gas specific gravity, actual pressure, maximum pressure and minimum pressure, elevation and coordinates specifying the relative location of the node.

Figure 3G:
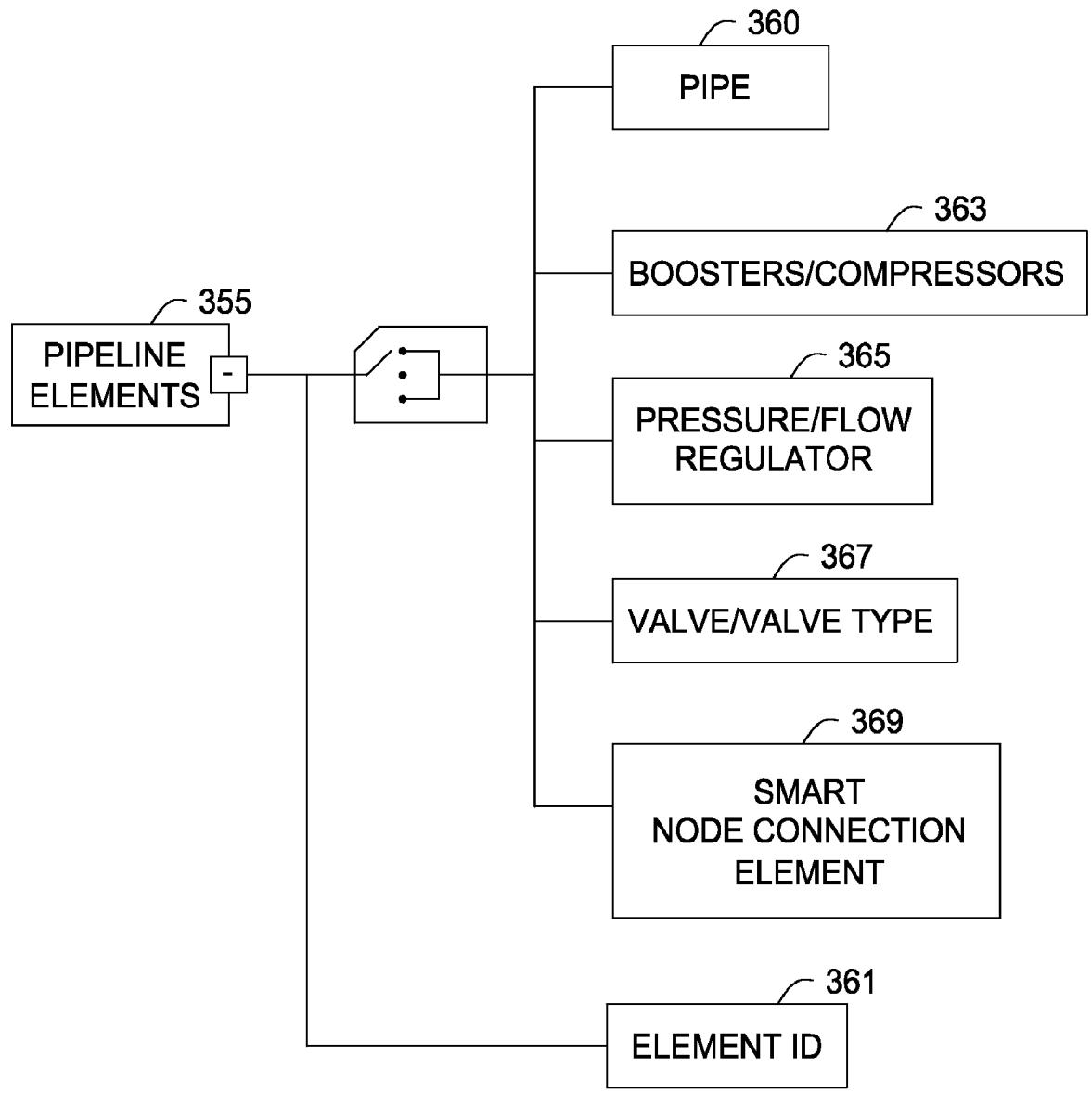

FIG. 3G illustrates the sub-elements of a pipeline element 355 as part of the exemplary XML grammar being described. As shown, a pipeline element 355 includes an element ID 361. Pipeline elements 355 may be distinguished from one another using the ID 361. In one embodiment, each pipeline element 355 may be used to represent a variety of common pipeline equipment components used to connect two node elements.

Illustratively, a pipeline element 355 may be used to represent one of a pipe 360, a booster or compressor 363, a pressure regulator 365, a valve 367, or a multi-element node 369. Generally, a pipe element 361 represents a conduit of pipe connecting two nodes. A pipeline element 361 may be further characterized by sub elements describing size, pressure etc. Booster/compressor element 363 represents a pipe element used to increase the pressure in a pipeline. A booster/compressor element 363 may be further characterized by sub elements describing the amount of pressure a booster element may provide, a cost of operating the element, etc. A pressure regulator element 365 represents a pipe element that will adjust pressure between one pipeline system or element and another pipeline system or element. A valve element 367 represents node connecting element where material may be moved between one pipeline system or element and another pipeline system or element.

Finally, smart node connecting elements (NCE) 369 represents a pipeline element 360 that can take on any of multiple configurations. A smart NCE represents elements in the pipeline system 300 that may be reconfigured to perform different functions. For example, a smart NCE may be configured to be any one, or combinations of the elements 361, 363, 365, 367 already described. For example, the pipeline system illustrated in FIG. 1 includes smart NCEs that a pipeline operator may be able to configure from a remote control center. Including smart NCEs in a pipeline allows the pipeline's configuration to be modified rapidly and remotely, so that the pipeline operator may adapt to changes in the pipeline's operation according to real-world conditions as they occur. At the same time, the presence of smart NCE elements 369 in a pipeline optimization problem makes the problem difficult for mathematical techniques to solve without exhaustively trying each of the different smart NCE configurations, since a single change in a single smart NCE element 369 can dramatically alter the hydraulic properties of the pipeline.

Figure 4:
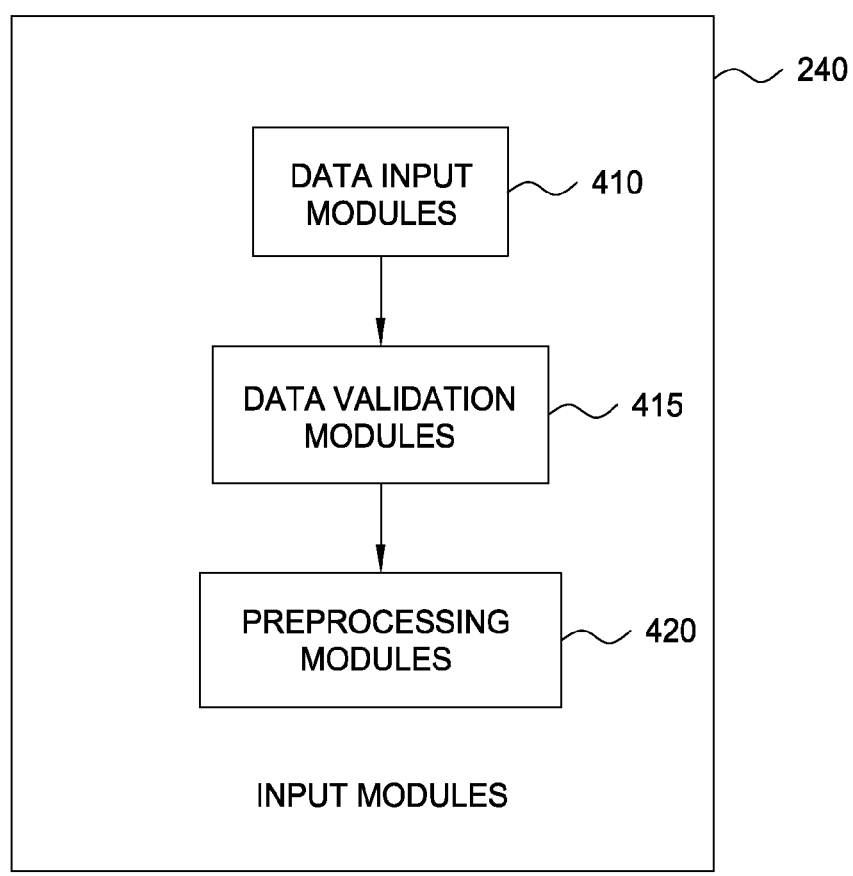
FIG. 4 illustrates a collection of input modules that may be included in the pipeline optimization application illustrated in FIG. 2, according to one embodiment of the invention.

FIG. 4 illustrates a collection of input modules 240 that may be included in the pipeline optimization application 210 illustrated in FIG. 2, according to one embodiment of the invention. In one embodiment, the input modules 240 may be configured to read in a description of the pipeline, user requirements, user-provided preferences, and user configurations of the optimization algorithm. For example, the input files 220 read in by the input module 410 may include an optimization file specifying optimization parameters such as the length of the optimization run, the constraints that are to be maintained in providing solutions, and whether previously-generated solutions are to be read in and used during this optimization run. Input module 410 also reads in input files 220 that describe the topology of the pipeline, the status of the pipeline, and constraints on pipeline operation. The input files 220 may be in the exemplary XML format, as described above.

The data validation module 415 may be configured to check input data for possible errors and for potential problems (e.g., such as whether the problem represented by the input data 220 may not be solved without violating a hard constraint). The data validation module 415 may also identify a variety of problems with input data 220, including, for example:

Invalid XML documents (e.g., multiple root elements, or unclosed elements)

a power cost for a plant less than or equal to zero actual or desired node pressures outside of minimum and maximum ratings for node elements mismatches between node name and pipeline element data.

duplicate reference IDs in multiple elements element data mismatches (e.g. an element has the same from and to nodes)

pipeline errors: (e.g., disconnected pipelines)

infeasible optimization target, (e.g., output pressures greater than input pressures)

Of course, one of ordinary skill in the art will recognize that additional data validations may be performed. In one embodiment, if the data validation module 415 determines that the input files 220 are invalid, then it may abort an optimization run and notify a user of what problem was identified. Alternatively, in the case of conditions that may be unusual but might be feasible, such as negative power costs, the data validation module 415 may send a warning to the user interface and to the run log file but does not necessarily abort the optimization run.

Before beginning an optimization run using a set of input data 220, the preprocessing module 420 may perform a number of preliminary computations in order to increase the efficiency of the optimization process. For example, preprocessing module 420 may cache the results of intensive computations so that the results of those computations may be retrieved at need in the future, instead of being recomputed in a redundant manner. For example, preprocessing module 420 may cache the optimal settings for a plant's configuration, given a target set of flows and pressures that the plant must obtain. The initial computation of the optimal settings in this case can be very time-consuming, but subsequent requests for the optimal settings (given the same target flows and pressures) require only the time to look up the optimal answer from the cache.

Figure 5:
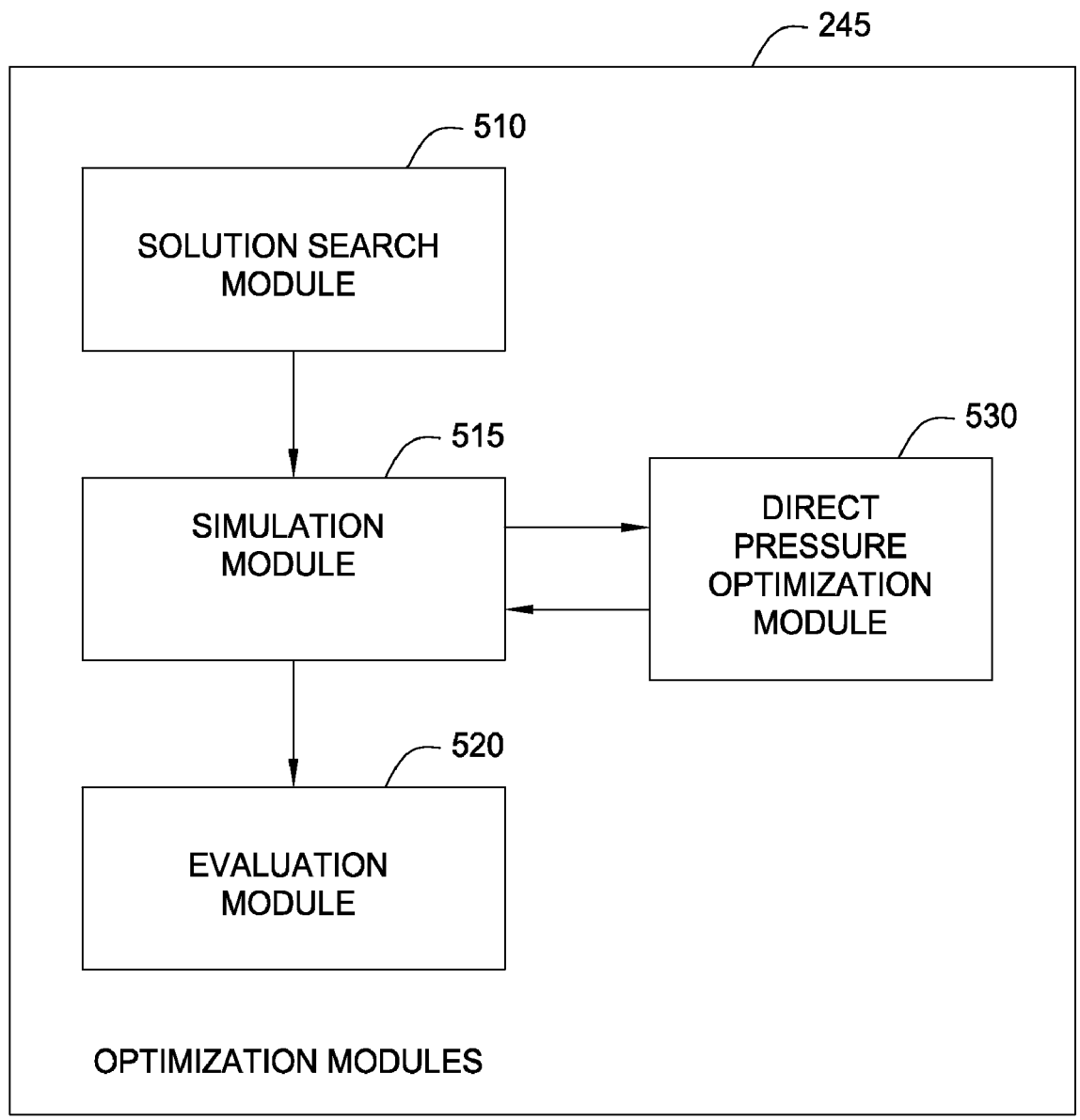
FIG. 5 illustrates a collection of optimization modules that may be included in the pipeline optimization application illustrated in FIG. 2, according to one embodiment of the invention.

FIG. 5 illustrates a collection of optimization modules 245 that may be included in the pipeline optimization application 210 illustrated in FIG. 2, according to one embodiment of the invention. As shown, optimization module 245 includes a solution search module 510, a simulation module 515, a direct pressure optimization (DPO) module 530, and an evaluation module 520. Collectively, the optimization modules 245 may be configured to analyze and evaluate the pipeline system model 225 in order to identify quality solutions to pipeline operation.

The solution search module 510 may be configured to perform an optimization algorithm used to optimize the operation of pipeline system model 225 read in by input modules 240. In one embodiment, the solution search module 510 operates by using a genetic algorithm—a process of modifying a collection of seed solutions (referred to as a "population")—inspired by the theory of evolution.

Generally, as known to one of ordinary skill in the art, a genetic algorithm generates a population of trial solutions each of which is evaluated (to yield a fitness value) and a new generation is created from the better of them. In one embodiment, the evaluation of a solution is performed by the evaluation module 520. The process is continued through thousands of generations with the aim that the population should "evolve" to contain better solutions over time. A genetic algorithm is an optimization technique that is sometimes characterized as "evolution on a computer". Typically, the genetic algorithm generates new solutions from the current population by processes of "mutation" and "cross-breeding". The best solutions found are likely to produce more offspring than the worst ones, and so the population of solutions tends to get better and better as the algorithm proceeds.

Genetic algorithms typically represent the solution as a (often fixed length) string of digital symbols, selecting parents from the current population in proportion to their fitness (or some approximation of this) and the use of some mechanism of "crossover"—the exchanging of elements between different solutions—as the dominant means of creating new members of the population. The initial population of solutions is typically created at random or from some known starting point.

Figure 6:
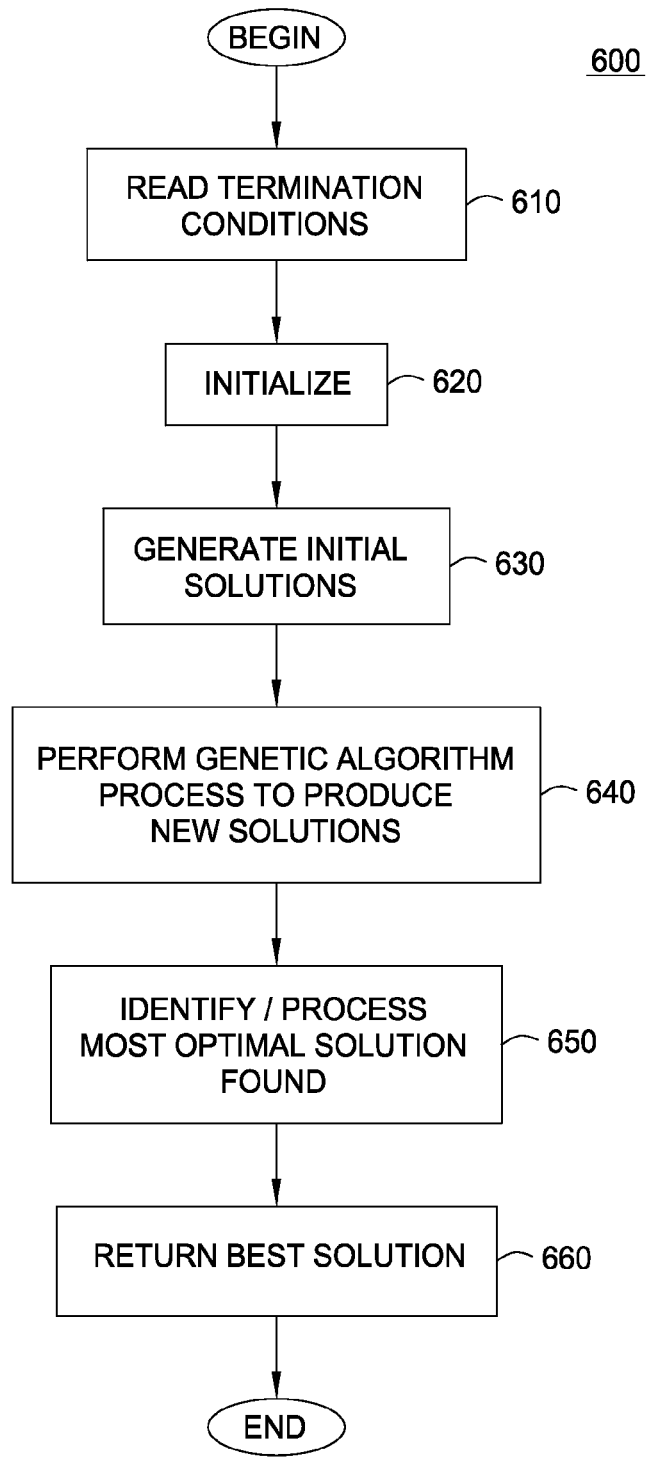
FIG. 6 illustrates a method optimizing aspects of the operation of a pipeline, according to one embodiment of the invention.

In one embodiment, the problem that the genetic algorithm is solving is to minimize the sum of the operating costs for each element in the pipeline including plants, together with the sum of the penalties imposed by a solution for violating soft constraints. The operating cost typically includes the sum of costs for all plants and compressors, and most of the constraints in the pipeline system are hard constraints. A solution is feasible so long as does not violate any hard constraints. Thus, in general, the "fitness" of a given solution is the real operating cost of that solution. FIG. 6, described below, illustrates an embodiment of the operations of the solution search module 510.

Table 1 shows an example of the general structure of a solution to the operation of the pipeline system illustrated in FIG. 1. Of course, for other pipeline systems, a solution will contain different elements from the ones listed below.

TABLE I

| | Genetic Algorithm Solution |
|---|---|
| GOX network | List of plant flows |
| | List of set pressures for non-pipe elements in loops |
| | List of Smart NCE choices |
| | List of known pressures not set by genetic algorithm |
| GAN network | List of plant flows |
| | List of set pressures for non-pipe elements in loops |
| | List of Smart NCE choices |
| | List of known pressures not set by genetic algorithm |

Table I lists a set of variables that are under the control of the optimization module 245. Determining a value for each of these variables is the goal of the optimization process. The list of plant flows, for example, may provide a list of output flows for each plant element contained in the input files 220. The list of plant flows would not include the flow for any plant whose flow has been fixed by the user. Any pressures not set by the genetic algorithm may be set by DPO module 530, as described below. The list of smart NCE choices represents the form that each configurable element is to take on in a given solution, selected from the allowable configurations for that smart NCE element (recall from above that a smart NCE element 369 may be configured to perform different functions within a pipeline system).

In one embodiment, the simulation module 515 may be configured to derive the functioning of the pipeline from a given solution. While doing so, the solution itself may be modified when a simulation is performed. The way that a solution underlies a simulation and evaluation of the pipeline is described below in conjunction with FIGS. 7-9. Additionally, an exemplary system walkthrough briefly describing the steps performed during an optimization run, according to one embodiment of the invention, is provided at the end of this description. For now, note that the optimization modules 245 creates, modifies, and preserves solutions of this form shown in Table 1, returning the best one it has found an optimization run terminates.

Once a solution search module 510 identifies a solution, the simulation module 515 may be configured to simulate the operation of a pipeline network. During a simulation, the solution identified by the solution search module 510 is transformed into a full picture of the state of the pipeline that results from the configuration specified by a solution.

The evaluation module 245 may be configured to evaluate a solution. In one embodiment, the evaluation module 245 may be configured to estimate the cost of operations of the simulated pipeline, including any optional penalties for undesirable performance. An example of a penalty that may be assessed against a solution is a penalty for excess venting of gas at a production facility. Such penalties may be expressed in terms of dollars, and are added to the operating costs of the pipeline. In one embodiment, the evaluation module 520 derives a total cost of operations for a solution as the sum of the operating cost for each of the components of the pipeline, including the plants and their equipment. Generally, the lower the total cost of a solution, the greater that solution's "fitness" for use by genetic algorithm performed by the solution search module 510.

FIG. 6 illustrates a method 600 for optimizing aspects of the operation of a pipeline system, according to one embodiment of the invention. The method 600 begins at step 610 where the solution search module 510 reads termination conditions specified by input files 220. If more than one is specified, then an optimization system terminates when any one of them is satisfied. In one embodiment, the termination conditions include: a maximum number of solutions generated, a maximum amount of clock time spent, or finding a solution that exceeds a specified quality (or fitness). Additionally, the user interface 260 may allow user to halt an optimization run manually (e.g., by entering an interrupt command from the keyboard). This is not a condition included in input file 220, but the optimization application 210 may check for this condition periodically during an optimization run.

At step 620, the solution search module 510 initializes an optimization run. This may include, for example, creating caches, initializing a plant optimizer, creating data structures used buy the search solution module 510, etc. At step 630, the solution search module 510 creates a set of initial solutions for the genetic algorithm. In other words, the solution search module 510 creates a "population" of solutions for the genetic algorithm to evolve through modification and breeding.

In one embodiment, solution search module 510 creates a first group of seed solutions based on smart heuristics and randomly-generates a second group of seed solutions. Generally, a heuristic is a rule of thumb that often works well to achieve a desired result, e.g., reducing cost while maintaining a desired level of production. Heuristics are often based on prior experience. An example of a heuristic used in the solution search module 510 is: "If the pressure in a region of the pipeline is neither at a maximum or minimum then consider raising or lowering the pressure, if this lowers cost and improves performance in adjacent regions of the pipeline."

To generate the first group of seed solutions, the solution search module 510 creates multiple "smart seeds," based on solution generation heuristics similar to those a human might use. For example, the first group of solutions may include a solution with all pressures and flows set at maximum, with repair heuristics to adjust the pressures down in reasonable ways to satisfy the pipeline pressure constraints. This seed can work well to produce a good solution in a case when high pressures are required. Another "smart seed" may include a solution with all pressures and flows set at minimum, with heuristics to adjust the pressures up in reasonable ways to satisfy customer pressure constraints. This seed can work well to produce a good solution in a case when the solution is centered on satisfying the most important clients, because the heuristics that increase pressure tend to look at the most critical client needs as pressures are increased. Another "smart seed" includes a solution with all pressures and flows set in the middle of the feasible range, so that subsequent optimization may find better solutions by moving these pressures either toward the maximum and minimum values in their range.

Additionally, the first group may include a group of solutions specified in the input files 220, if any. Doing so allows a user to provide sample solutions to the search solution module 510 that are different from the ones above. For example, if there is a database of solutions to prior problems, a smart algorithm may be used to match the current state of the pipeline and its requirements to prior states, then it may be reasonable to seed the initial population with the solution to one or more prior states that are similar to the current state.

In addition to the first group of seed solutions, the search solution module 510 may also generate a group of randomly-generated solutions that satisfy the constraints specified in the input files 220, in order to fill up a population of solutions. This population of solutions provides much of the diversity that allows the genetic algorithm to explore the wide range of solutions at the start of the optimization process.

Figure 7:
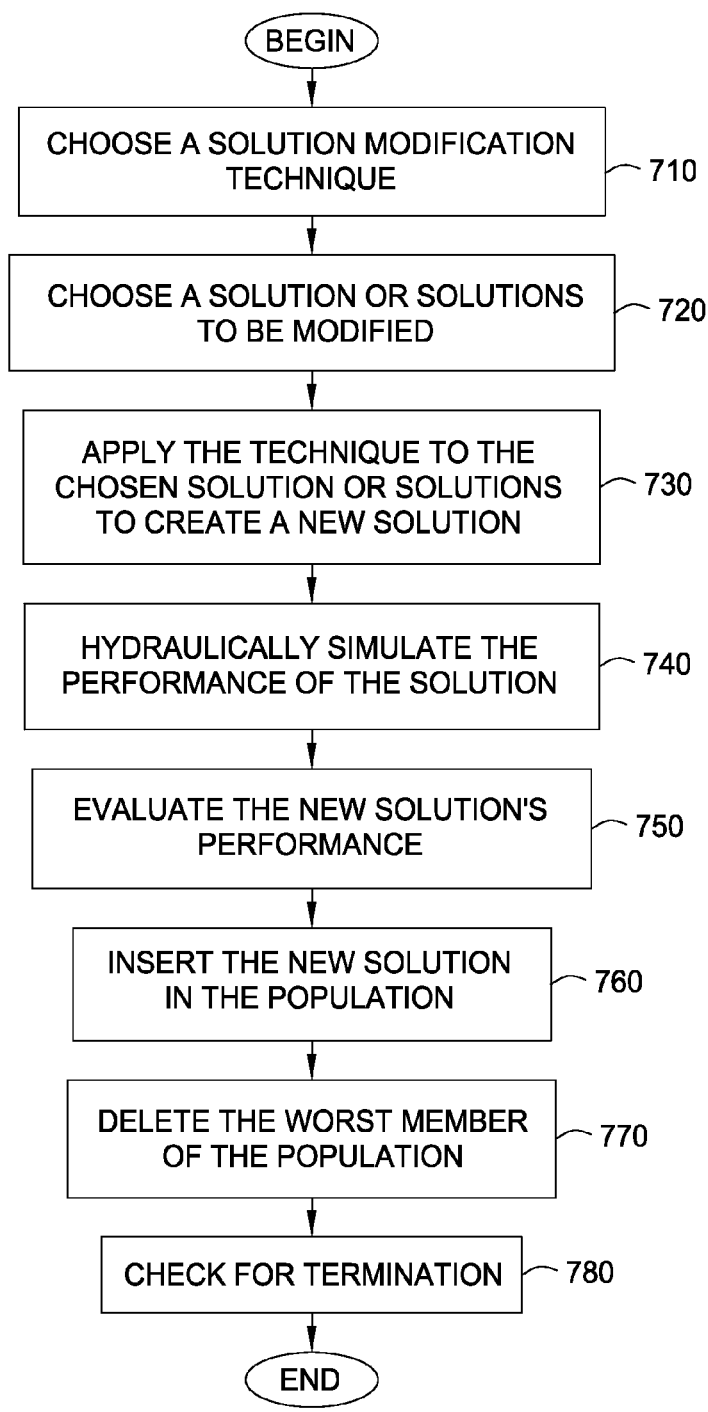
FIG. 7 illustrates a method of performing an optimization process used to optimize aspects of the operation of a pipeline, according to one embodiment of the invention.

At step 640 the solution search module 510 generates new solutions. As stated, in one embodiment, the solution search module is configured to produce new solutions by performing a genetic algorithm using the population of initial solutions generated at step 630. Generally, it is contemplated that the genetic algorithm will operate to "evolve" the population of initial solutions over many thousands of generations, generating a new population at each generation. FIG. 7, described below, further illustrates an embodiment of the actions performed as part of step 630.

Once step 630 completes, the optimization module 245 will typically have generated many solutions. At step 650, the best solution currently in the population (i.e., the one with the lowest operational costs) is identified and processed. In one embodiment, the solution identified as the best solution may be passed to additional optimization routines. For example, a plant optimizer may be run for the solution to verify that the plant configurations specified in the solution are feasible and to determine whether any further optimizations to the configurations may be readily identified. At step 660, the best identified solution generated during the optimization run is returned. For example, the output module 250 may be configured to generate output files 255.

FIG. 7 illustrates a method 700 for finding an optimized solution to the operation of a pipeline system, according to one embodiment of the invention. In one embodiment, the method 700 may be performed again and again—tens of thousands of times, in a standard optimization run—in order to find a high-performance solution to a pipeline optimization problem. During each run through the method 700, the solution search module 510 generates at least one new solution from the set of solutions currently in the population. The initial population is created at part of the method 600 described above.

At step 710, a solution modification technique is selected. In the classical genetic algorithm, solution modification techniques are random in nature—they modify some small percentage of pressures, for example—but searching for better solutions with random changes is not as fast or effective as searching with directed heuristics. Accordingly, in one embodiment the optimization modules 245 may be configured to select from a number of non-heuristic (i.e., random) and heuristic (i.e., non-random) techniques to modify a solution, including the following:

Random Change. This modification technique generates a random mutation to one parameter in a solution.

Shift production. This modification technique moves production from a plant where it is expensive to a plant where it is cheaper.

Reduce Venting. This modification technique looks for plants that are venting gases, checks the penalty for venting, and looks for ways to change the production levels at one of those plants.

Change Configuration of Smart NCE. This modification technique identifies whether a modification to a reconfigurable elements might enhance the solution's performance. If so, an allowable change to the configuration of a smart NCE is selected. This heuristic uses some of the processes that a human pipeline expert would use to decide whether to change the configuration of a reconfigurable pipeline component.

Shut Down Plant. This heuristic identifies solutions in which shutting down a plant might save money. For example, if the cost of production at one plant is very high, then shutting down this plant and shifting production to others may improve the fitness of a solution.

Activate Plant. This heuristic identifies solutions in which activating a plant when it might profitably be turned on. A new solution may be created by selection of an inactive plant to turn on. This technique may use some of the reasoning that a human pipeline expert would use to decide which plants are candidates to be turned on.

Crossbreed Two Solutions. This heuristic selects two solutions and creates a new solution by cross-breeding the two original solutions. The different parts of the two original solutions are combined to create the new solution. For example, the two lists of parameter values that comprise the first part of the two solutions can be used to determine randomly, field by field, which of the two original solutions contributes its value to the new solution. This solution allows effective elements of two different solutions to be recombined with one another.

In one embodiment, any of these (or other) techniques may be selected during a pass through this cycle of optimization. Additionally, modification techniques may be selected probabilistically using default probabilities or using probabilities specified in input files 220. Thus, although any modification technique has a chance of being chosen, some may have higher probabilities than others. Setting the probabilities is a matter of experiment and analysis of the types of solutions the optimizer produces for a given pipeline.

At step 720, one or more solutions from the current pool of solutions is selected for modification according to the modification technique selected at step 710. Once a modification technique has been selected, whether one or two solutions are required as inputs is determined. Most of the modification techniques described above require only one, but the crossbreeding modification, for example, requires two.

In one embodiment, solutions are chosen from the general population of solutions using a technique sometimes called a ranked roulette wheel technique. The technique is described as "ranked" because it sorts the solutions in the population of solutions into a list, ordered from best solution to worst. It then assigns a weight to each solution in the list. These weights decrease linearly. For example, with a decrease rate of 10 and a start weight of 100, the first 12 members of the population would have weights of 100, 90, 80, 70, 60, 50, 40, 30, 20, 10, 1, 0.5, . . . . These weights are used to bias the selection process so that the best individuals are more likely to be chosen than the worst ones. The metaphor is one of a roulette wheel with a slot for each member of the population. The slots are not of equal size, however. Each solution's slot is proportional to its weight, calculated as above. When the roulette wheel is set up in this way, a computerized ball is spun, and the individual in whose slot the ball lands is chosen. The best individual in the population, with a weight and slot size of 100, is 100 times more likely to be chosen when a solution is required than the worst individual, with a weight and slot size of 1. This weighted selection process corresponds to the notion of "survival of the fittest" in the theory of natural selection, in that the best individuals tend to be chosen for reproduction more often than the worst ones.

At step 730, the selected solution modification technique is used to create a new solution. In this step of the method 700, the solution chosen is cloned to create a new solution identical to the original solution. The modification procedure is then applied to the new solution so that it is a modified version of the original solution. Some of the modifications are very small—change pressure a bit at one location in the pipeline, for example. Some are quite significant—change the configuration of a reconfigurable component of the pipeline from a valve to a booster or a compressor, for example.

The solution is cloned so that both the "clone" and its "parent" can be maintained in the population. If the modification is a good one, it is likely that the parent will eventually be eliminated from the population while the new solution and its descendants are included in the population. If the modification produces a bad solution, then the new solution is likely to be eliminated from the population, while the original solution is retained and has the potential to be modified to create other new solutions.

At step 740, the performance of the new solution is simulated. As part of this step, the new solution is used to create a full simulation of the state of the pipeline resulting from this solution. Additionally, a linear optimization process may be applied through the use of the DPO optimization module 530. The simulation of the solution generated at step 740 is further described in FIGS. 8 and 9.

At step 750, the "fitness" of the simulated pipeline derived from a new solution is evaluated. As described above, the evaluation module 520 may be configured to derive a cost (i.e., a fitness or evaluation score) of a new solution. At step 760, the new solution is added to the population. In one embodiment, the population of solutions is maintained in a sorted order, so the new solution will be placed according to its evaluation. At step 770, the worst (i.e., least fit) member of the population is removed from the population. Thus, the population size may remain constant during the optimization process. At step 780, the search solution module 510 determines whether any of termination conditions are satisfied. If so, the optimization process terminates and control returns to step 650 of the method 600. Otherwise, the method 700 is repeated to produce another new solution (i.e., the population moves through another generation).

Figure 8:
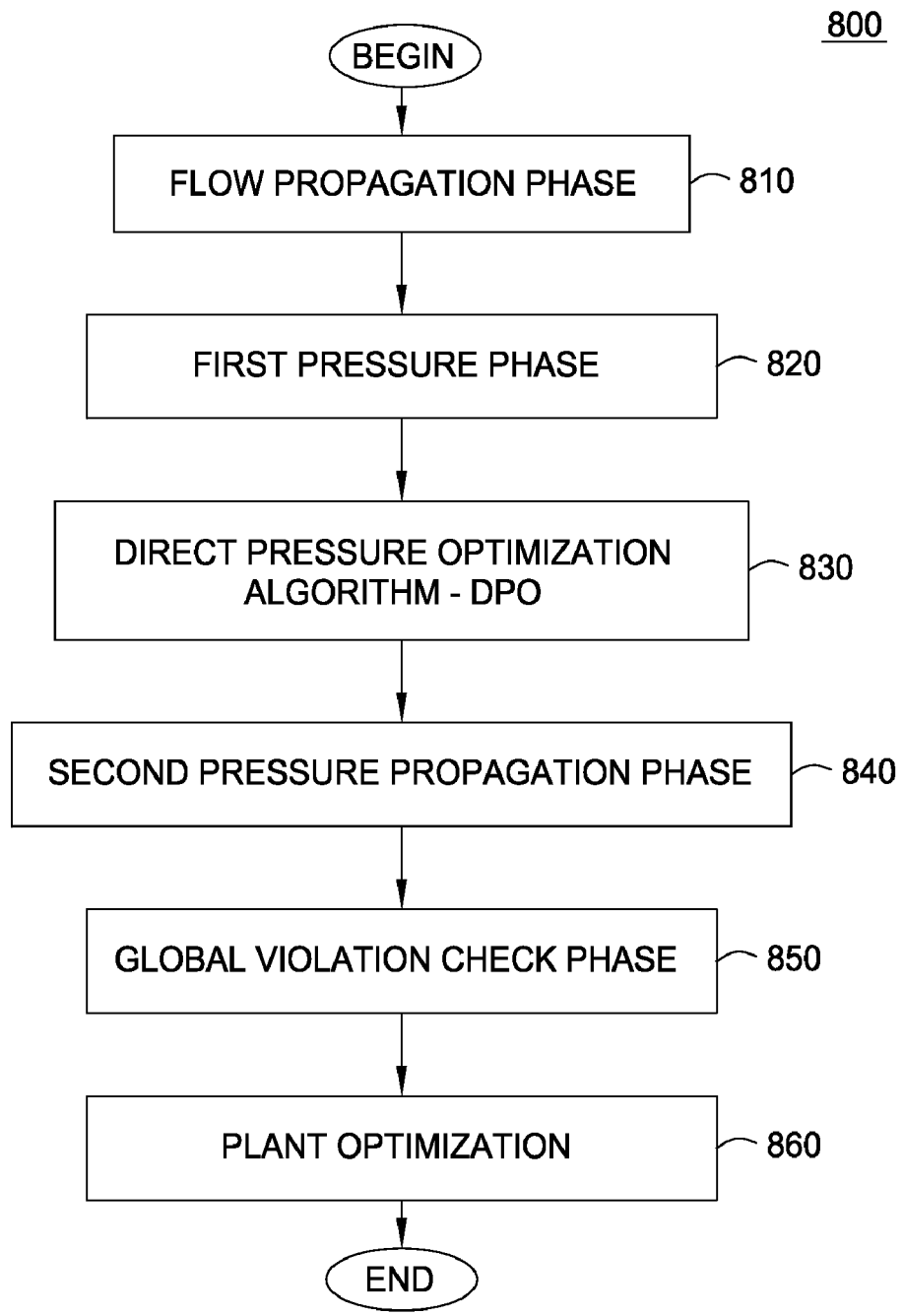
FIG. 8 illustrates a method for simulating the operation of a pipeline, according to one embodiment of the invention.

FIG. 8 illustrates a method for simulating the operation of a pipeline system, according to one embodiment of the invention.

At step 810 the method 800 includes a flow propagation phase. During this phase, the simulation module 515 uses the input pressures, element settings, and known flows and hydraulic equations chosen by the user to compute the flows throughout the pipeline, based on the input solution. In one embodiment, the propagation of flows is performed according to the Newton Nodal algorithm specified in *Simulation and Analysis of Gas Networks* by Andrzej Osiadacz. Using this algorithm, flows may be computed based on the known pressures, settings and configurations for the various equipment elements in the pipeline specified by input files 220.

Once the first flow propagation has been computed, the simulation module 515 may determine whether any flow violations are present in the system (e.g., insufficient flows to client sites, etc). If flow violations are found, the simulation module 515 notes this fact and aborts further simulation of the solution as it is not necessary to continue building and optimizing the pipeline simulation that is known to violate a hard constraint. At the conclusion of the flow propagation phase, the system notes what amount of flow is passing through each component of the pipeline.

At step 820, the simulation module 515 uses the flows computed in the flow propagation phase (step 810) to determine the pressure at each element in the pipeline. In one embodiment, the determination of pressures is an iterative process and may also be based on the algorithms specified in the Osiadacz's book referenced above. It should be noted that the pressure computation is carried out through iterative matrix optimization and linear programming techniques. As is known, linear programming is a mathematical procedure for minimizing or maximizing a linear function of several variables, subject to a finite number of linear restrictions on these variables.

The simulation module 515 notes any infeasible pressures—pressures that exceed the maximum allowed pressure at some element, for example. If any infeasible pressures are identified, the simulation module 515 will continue the simulation building process (it is necessary to continue building and optimizing the pipeline simulation because the infeasible pressures may be corrected during by the DPO module 530). At the conclusion of the first pressure propagation phase, the simulation module 515 notes what the flow pressure and flow rates through each component of the pipeline.

At step 830, the DPO module 530 may be configured to perform a direct pressure optimization algorithm (henceforth, "DPO") to reduce pressures wherever possible. Generally, the DPO decreases the amount of optimization required by the system, and thus decreases dramatically the time required for the optimization process to one. Additionally, the DPO module may be configured to improve the solution quality by ensuring the minimal pressure possible for the whole pipeline.

Figure 9:
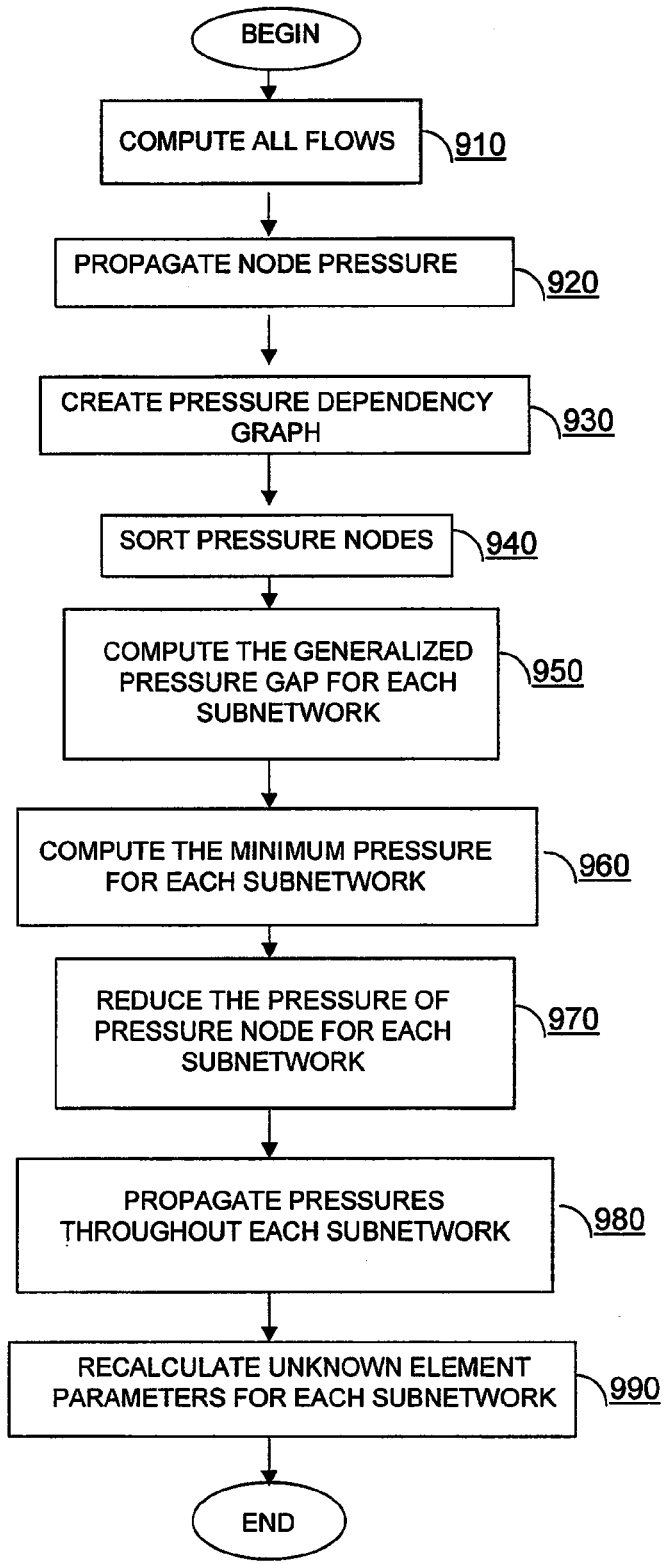
FIG. 9 illustrates the operations of a direct pressure optimization module, according to one embodiment of the invention.

The DPO module 530 is based on the insight that the optimization of a pipeline system may be dramatically simplified if the genetic algorithm only specifies flows and the allocation of flows for a solution, while a simpler, direct approach is used to optimize pressures once flows are allocated. FIG. 9, described below, includes a detailed description of an embodiment of a DPO optimization algorithm that may be performed by the DPO module 530.

At step 840, the method 800 includes a second pressure propagation phase. In the second pressure propagation phase, the simulation module 515 uses the pressures computed in the DPO algorithm phase to determine the pressure at each element in the pipeline. In one embodiment, the determination of pressures in this phase is done with the same techniques used in the first pressure propagation phase. The output of the second pressure propagation phase is the pressure at each element of the pipeline.

At step 850, the method 800 includes a global violation check phase. At this step, the simulation module 515 may be configured to identify any pressure violations in the pipeline system, such as pressure values for elements that fall outside allowable ranges. If any such violations are found, the system notes the violation and exits the simulation process.

In one embodiment, at the conclusion of the hydraulic pipeline simulation, the following things have occurred: the pressure and flow for each element in the system have been established in a hydraulically feasible way, and the simulation has been judged to satisfy all constraints, or its failure to do so has been noted some of the pressures in the system have been adjusted by the DPO algorithm; the pressures and flows at each plants have been specified.

At step 860, the method 800 may include a plant optimization phase. At this step, the optimization module 245 uses the pressures and flows for each plant and determines an efficient way for each plant to produce the pressures and flows assigned to it in the prior phases of the simulation process. A detailed description of the plant optimization process follows.

In other words, step 860 involves finding a low-cost configuration for each plant that satisfies that plant's requirements for generating the pressure and flow specified by a solution. For example, to configure the plants so as to produce the required levels of pressure and flow, the optimization module 245 may be configured to perfume a brute-force search algorithm. This technique may be useful for plant system models that include less than two ASUs and two compressors (less than 4 total), then a brute force search algorithm may be used to search all possible configurations.

As plant models become more complex, however, the number of possible configurations may rapidly become too large to perform a brute force search in a reasonable time. In such a case, a repair algorithm may be used to configure the plants to produce the pressures and flows specified by a solution. In general, a repair algorithm begins with each device (e.g., each ASU and compressor) operating at maximum. It sorts the devices in decreasing order of per-unit cost to produce product. It then turns off each item in the list, in order, until production is reduced to the desired level. The last device may be turned down instead of being turned off. If the minimum required level of production for the last device is higher than the required level, the algorithm repeats, looking for the highest-cost devices to turn down so that production is lowered to the desired level.

Once step 860 is completed, the pressure and flow of each element in the pipeline are known, and the configuration of each plant to produce its pressures and flows are also known. It is important to note that many of the pressures under the control of the optimizer may differ from those in the original solution. Differences will be due, for example, to reductions in pressure owing to the DPO algorithm, or other local optimization processes.

The method 800 described above might conceivably be executed a great number of times if the solutions being generated by the genetic algorithm contain identical flow requirements for a given plant. In one embodiment, therefore, solutions derived through the process described above are added to a cache that is accessed each time step 860 is perfumed. If the cache contains a solution that has already been derived for a problem similar to the current problem, then the cached solution is used rather than repeating the plant optimization process. After the plant optimization procedure, the simulation process is complete and processing returns to step 750 of the method 700 where the solution just generated and optimized may be evaluated. Once evaluated, the solution may be included in the overall population of solutions operated on by the genetic algorithm process described above.

FIG. 9 illustrates the operations of a direct pressure optimization module 530, according to one embodiment of the invention. The method 900 begins at step 910 where the DPO module 530 calculates the flows through all elements of the pipeline and the "nodal" flows (i.e. flow into or out of the pipeline) at any flow nodes. At the point, the solution generated by genetic algorithm has already chosen values for all of the flow and pressure variables it is optimizing. At step 910, the pressure node pressures that the DPO is optimizing are set to some fixed values based on the minimal and maximum pressure limits.

At step 920, the hydraulic model then propagates node pressures, determining the pressures at all node elements of the pipeline. At step 930, the DPO module 530 optimizes the pressure nodes in a particular order. In one embodiment, the DPO generates a directed graph data structure where the vertices represent sub networks within the pipeline and the directed edges represent connecting elements, with the edge directions opposite to the direction of connecting element gas flow; i.e., the edges point in the direction of the required pressure gradient across the connecting element.

As used herein, the directed graph is referred to as a pressure dependency graph (PDG), as the pressure of each individual node depends on the edges flowing from that node. Note, that the PDG changes when the direction of flow in the pipeline can depend on the configurations of a smart NCE (i.e., a smart NCE may be able to cause flows in different direction within the pipeline system, depending on its configuration). Because of this, in one embodiment, the DPO module 530 caches a PDG for each possible architecture of the pipeline that may result from different smart NCE configurations. If the PDG is acyclic (i.e. the PDG contains no cycles), then the pressures can be minimized in a single pass.

At step 940, the DPO module 530 sorts the list of pressure nodes to be directly optimized, according to a partial ordering indicated by the PDG. For example, if the PDG is acyclic, then presence of a directed edge from vertex a to vertex b indicates that the DPO must optimize the pressure in sub network with vertex a before optimizing the pressure in sub network that includes vertex b. Next, the DPO module 530 optimizes pressures, carrying out the direct pressure optimization of pressure nodes in the order given by the sorted list of pressure nodes.

At step 950, for each sub network and pressure node in a sub network present the PDG, the DPO module 530 iterates over all of the nodes in that sub network, and keeps track of the minimum generalized pressure gap or headroom for that sub network.

At step 960, the DPO module 530 computes the minimum pressure for each node in the sub network. At step 970, after iterating over the nodes of a sub network, the DPO module 530 adjusts the sub network's pressure node pressure to reduce the sub network's minimum actual pressure headroom to 0.01 PSI. For example, for a high-pressure network, the pressure may be given by the following equation: $p_{opt} = \sqrt{p_{init}^2 - g^2}$, where $p_{opt}$ is the optimized pressure-node pressure, $p_{init}$ is the initial pressure-node pressure, and g is the generalized minimum pressure gap.

At step 980, the DPO module 530 then propagates the newly optimized pressure at the pressure node throughout the sub network. At step 990, the DPO module 990 module recalculates the pressure values for any unknown element parameters in the sub network. After DPO module 530 completes performing the method 900, the processing returns to step 830 of the method 800.

At the conclusion of the method 900, the solution may have had some of its pressures reduced, while still maintaining the performance required (i.e., all hard constraints remain satisfied).

Example System Walkthrough

In one embodiment, the optimization system 200 proceeds through the following steps in order to solve a pipeline optimization problem. The following walkthrough generally corresponds to the methods illustrated in FIGS. 6-9, using the inputs and modules illustrated in FIGS. 3-5:

1. The input files 220 are prepared, either by the user through editing the input files 220, or by generating the input files 220 from pipeline status database 215.
2. The data input module 410 reads data from the input files 220 and creates the required structures to store the data that is read in by the module.
3. The data validation module 415 validates the input data files, creating a log of any potentially incorrect data.
4. The preprocessing module 420 initializes the optimization (e.g., by analyzing the connectivity of the pipeline network represented by input files 220, creating sub network data structures, and so forth).
5. The solution search module 510 reads termination conditions.
6. The solution search module 510 initializes the structures it will use during the optimization process.
7. The solution search module 510 generates an initial population of solutions, using both the seed solution generation heuristics and random solution generation procedures.
8. The solution search module 510 simulates and evaluates each of the solutions in its initial solution set.
9. The solution search module repeats the following inner loop sequence of steps until its termination criteria is satisfied:
    a. The solution search module 510 selects a solution modification technique.
    b. The solution search module 510 selects as many solutions as are required by the solution modification technique-typically, either one or two.
    c. The solution search module 510 generates a new solution (or solutions) by copying the selected solution(s).
    d. The solution search module 510 applies the modification technique to the new solution.
    e. The simulation module 515 simulates the hydraulic performance of the new solution. In one embodiment, this process may include the following steps:
        i. The simulation module 515 propagates flow throughout the pipeline, based on the solution's settings. If there are any flow violations, the simulation module 515 aborts the current pass.
        ii. The simulation module 515 performs a first pressure propagation pass.
        iii. The direct pressure optimization module (DPO) 530 performs a direct pressure optimization algorithm, possibly changing some of the pressures of some of the elements of the pipeline. In one embodiment, this process may include the following steps:
            aa. The DPO module 530 computes all flows.
            bb. The DPO module 530 propagates node pressures.
            cc. The DPO module 530 creates a pressure dependency graph.
            dd. The DPO module 530 sorts the pressure nodes.
            ee. The DPO module 530 computes the generalized pressure gap for each sub network.
            ff. The DPO module 530 computes the minimum pressure for each sub network.
            gg. The DPO module 530 reduces, where possible, the pressure of the pressure node for each sub network.
            hh. The DPO module 530 propagates pressures throughout each sub network.

ii. The DPO module 530 recalculates unknown element parameters. See FIG. 9, Item 990 for each sub network.

iv. The simulation module 515 performs a second pressure propagation pass. If there are any pressure violations, the simulation module 515 aborts the current pass.

v. The simulation module 515 performs a global check for pressure constraints. If there are any global constraint violations, the simulation module 515 aborts the current pass.

vi. The simulation module 515 configures each plant so that it can produce the pressure and flow specified in the solution in the most economical manner.

f. The evaluation module 520 evaluates the new solution's performance and associates this evaluation with the new solution.

g. The new solution is inserted into the population.

h. The worst solution in the population is deleted.

i. The solution search module 510 determines whether it should terminate. If so, the solution search module 510 goes to the final stage of the process. Otherwise, the solution search module 510 returns back to step a, above, and executes the inner loop sequence again.

10. Once the simulation module 515 has terminated the inner loop sequence, the best solution currently in the population is identified.

11. The post-processing routines are applied to the best solution found.

12. Output module 250 generates reports describing the system run, the best solution found, and any other interesting features of the run.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A computer-implemented method of optimizing operation of a pipeline system, comprising:

executing instructions on one or more computer processors to perform operations, comprising:

a) reading input data, wherein the input data describes the pipeline system;

b) generating a population of solutions, wherein each solution in the population specifies a feasible operational state for the pipeline system;

c) evaluating an expected performance of each solution in the population and sorting the solutions in the population according to the evaluations;

d) performing a genetic algorithm optimization process on the population of solutions until a termination condition specified by the input data is satisfied, whereby a plurality of optimized production solutions is generated;

e) after the genetic algorithm optimization process is performed, selecting an optimized production solution from the plurality of optimized production solutions, wherein the selected optimized production solution has a highest evaluation, relative to the evaluations of other solutions in the population; and f) generating an optimized pressure solution specifying an output pressure for one or more delivery points of the pipeline system and an input pressure for one or more production nodes of the pipeline system, for the selected optimized production solution, using a direct pressure optimization process to change pressures of some pipeline elements, wherein the direct pressure optimization is performed by:

calculating flows thorough a plurality of elements and nodes of the pipeline system;

determining and propagating pressures at the plurality of nodes;

generating a pressure dependency graph and using it to compute generalized pressure gap and minimum pressure for each sub network;

reducing pressures of high pressure nodes where possible;

propagating the pressures through the nodes of each sub network; and recalculating at least one unknown parameter of the elements of each sub network.

2. The method of claim 1, wherein performing the genetic algorithm optimization process comprises:

a) modifying at least one solution in the population by modifying at least one aspect of the feasible operational state specified by the at least one solution;

b) simulating the operation of the pipeline system, according to the feasible operational state specified by the modified solution;

c) evaluating an expected performance of the modified solution;

d) adding the modified solution to the population; and e) removing a solution from the population with a poorest evaluation, relative to the evaluations of other solutions in the population.

3. The method of claim 2, wherein modifying the at least one aspect of the feasible operational state specified by the at least one solution in the population, comprises:

a) selecting a solution modification technique;

b) selecting the at least one solution from the population to modify; and c) modifying the at least one solution, according to the selected solution modification technique.

4. The method of claim 3, wherein the solution modification technique randomly modifies the least one aspect of the feasible operational state specified by the at least one solution.

5. The method of claim 3, wherein the solution modification technique modifies the at least one solution according to a heuristic rule.

6. The method of claim 3, wherein the solution modification technique cross-breeds two or more solutions to generate the modified solution.

7. The method of claim 1, wherein modifying the at least one aspect of the feasible operational state specified by the at least one solution in the population, comprises probabilistically selecting one or more solutions, wherein a solution with a superior evaluation is more likely to be selected for modification than a solution with an inferior evaluation.

8. The method of claim 1, further comprising, validating that the input data describes a feasible pipeline system, according to a set of constraints.

9. The method of claim 1, wherein the termination condition specified by the input data includes at least one of a maximum number of solutions generated, a maximum amount of time spent, a maximum number of generations, and a generation of a solution that exceeds a specified evaluation threshold.

10. The method of claim 1, wherein generating the population of solutions comprises:

generating a first group of solutions and a second group of solutions, wherein the first group of solutions is generated according to heuristic rules, and wherein the second group of solutions is generated using a random process; and combining the first group of solutions and the second group of solutions to form the generated population of solutions.

11. The method of claim 1, wherein the input data comprises at least one extensible markup language (XML) document.

12. The method of claim 1, wherein the input data is retrieved from a pipeline status database that stores a current operational state of the pipeline system.

13. A computer-readable storage medium containing a program which, when executed, performs a method for optimizing operation of a pipeline system, the computer-readable storage medium comprising instructions for:
 a) reading input data, wherein the input data describes the pipeline system to be optimized;
 b) generating a population of solutions, wherein each solution in the population specifies a feasible operational state for the pipeline system;
 c) evaluating an expected performance of each solution in the population and sorting the solutions in the population according to the evaluation;
 d) performing a genetic algorithm optimization process on the population until a termination condition specified by the input data is satisfied, whereby a plurality of optimized production solutions is generated;
 e) after the genetic algorithm optimization process is performed, selecting an optimized production solution from the plurality of optimized production solutions, wherein the selected optimized production solution has a highest evaluation, relative to the evaluations of other solutions in the population;
 f) generating, for the selected optimized production solution, an optimized pressure solution specifying an output pressure for one or more delivery points of the pipeline system and an input pressure for one or more production nodes of the pipeline system, using a direct pressure optimization process to change pressures of some pipeline elements, wherein the direct pressure optimization is performed by:
 calculating flows thorough a plurality of elements and nodes of the pipeline system;
 determining and propagating pressures at the plurality of nodes;
 generating a pressure dependency graph and using it to compute generalized pressure gap and minimum pressure for each sub network;
 reducing pressures of high pressure nodes where possible;
 propagating the pressures through the nodes of each sub network; and
 recalculating at least one unknown parameter of the elements of each sub network.

14. The computer-readable storage medium of claim 13, wherein performing the genetic algorithm optimization process, comprises:
 a) modifying at least one solution in the population by modifying at least one aspect of the feasible operational state specified by the at least one solution;
 b) simulating the operation of the pipeline system, according to the feasible operational state specified by the modified solution;
 c) evaluating an expected performance of the modified solution;
 d) adding the modified solution to the population; and
 e) removing a solution from the population with a poorest evaluation, relative to the evaluations of other solutions in the population.

15. The computer-readable storage medium of claim 14, wherein modifying the at least one aspect of the feasible operational state specified by the at least one solution in the population, comprises:
 a) selecting a solution modification technique;
 b) selecting the at least one solution from the population to modify; and
 c) modifying the at least one solution, according to the selected solution modification technique.

16. The computer-readable storage medium of claim 15, wherein the solution modification technique randomly modifies the least one aspect of the feasible operational state specified by the at least one solution.

17. The computer-readable storage medium of claim 15, wherein the solution modification technique modifies the at least one solution according to a heuristic rule.

18. The computer-readable storage medium of claim 15, wherein the solution modification technique cross-breeds two or more solutions to generate the modified solution.

19. The computer-readable storage medium of claim 13, wherein modifying the at least one aspect of the feasible operational state specified by the at least one solution in the population, comprises probabilistically selecting one or more solutions, wherein a solution with a superior evaluation is more likely to be selected for modification than a solution with an inferior evaluation.

20. The computer-readable storage medium of claim 13, wherein the method further comprises, validating that the input data describes a feasible pipeline system, according to a set of hard constraints.

21. The computer-readable storage medium of claim 13, wherein the termination condition specified by the input data includes at least one of a maximum number of solutions generated, a maximum amount of time spent, a maximum number of generations, and a generation of a solution that exceeds a specified evaluation threshold.

22. The computer-readable storage medium of claim 13, wherein generating the population of solutions comprises:
 generating a first group of solutions and a second group of solutions, wherein the first group of solutions is generated according to heuristic rules, and wherein the second group of solutions is generated using a random process; and
 combining the first group of solutions and the second group of solutions to form the generated population of solutions.

23. The computer-readable storage medium of claim 13, wherein the input data comprises at least one extensible markup language (XML) document.

24. The computer-readable storage medium of claim 13, wherein the input data is retrieved from a pipeline status database that stores a current operational state of the pipeline system.

25. A system for optimizing the operation of a pipeline system, comprising:
 a) a processor; and
 b) an optimization program, which when executed by the processor, is configured to:
 i) read input data, wherein the input data describes the pipeline system to be optimized;
 ii) generate a population of solutions, wherein each solution in the population specifies a feasible operational state for the pipeline system;

iii) evaluate an expected performance of each solution in the population of solutions and sort the solutions in the population according to the evaluations;

iv) perform a genetic algorithm optimization process on the population until a termination condition specified by the input data is satisfied, whereby a plurality of optimized production solutions is generated;

v) after the genetic algorithm optimization process is performed, selecting an optimized production solution from the plurality of optimized production solutions, wherein the selected optimized production solution has a highest evaluation, relative to the evaluations of other solutions in the population; and vi) generate, for the selected optimized production solution, an optimized pressure solution specifying an output pressure for one or more delivery points of the pipeline system and an input pressure for one or more production nodes of the pipeline system, using a direct pressure optimization process to change pressures of some pipeline elements, wherein the direct pressure optimization is performed by:

calculating flows thorough a plurality of elements and nodes of the pipeline system;

determining and propagating pressures at the plurality of nodes;

generating a pressure dependency graph and using it to compute generalized pressure gap and minimum pressure for each sub network;

reducing pressures of high pressure nodes where possible;

propagating the pressures through the nodes of each sub network; and recalculating at least one unknown parameter of the elements of each sub network.

26. The system of claim 25, wherein the optimization program is configured to perform the genetic algorithm optimization process by:

a) modifying at least one solution in the population by modifying at least one aspect of the feasible operational state specified by the at least one solution;

b) simulating the operation of the pipeline system, according to the feasible operational state specified by the modified solution;

c) evaluating an expected performance of the modified solution;

d) adding the modified solution to the population; and e) removing a solution from the population with a poorest evaluation, relative to the evaluations of other solutions in the population.

27. The system of claim 26, wherein the optimization program is configured to modify the at least one aspect of the feasible operational state specified by the at least one solution in the population by performing the steps of:

a) selecting a solution modification technique;

b) selecting the at least one solution from the population to modify; and c) modifying the at least one solution, according to the selected solution modification technique.

28. The system of claim 27, wherein the solution modification technique randomly modifies the least one aspect of the feasible operational state specified by the at least one solution.

29. The system of claim 27, wherein the solution modification technique modifies the at least one solution according to a heuristic rule.

30. The system of claim 27, wherein the solution modification technique cross-breeds two or more solutions to generate the modified solution.

31. The system of claim 25, wherein modifying the at least one aspect of the feasible operational state specified by the at least one solution in the population, comprises probabilistically selecting one or more solutions, wherein a solution with a superior evaluation is more likely to be selected for modification than a solution with an inferior evaluation.

32. The system of claim 25, wherein the termination conditions specified by the input data include at least one of a maximum number of solutions generated, a maximum amount of time spent, a maximum number of generations, and a generation of a solution that exceeds a specified evaluation threshold.

33. The system of claim 25, wherein the optimization program is configured to generate the population of solutions by:

generating a first group of solutions and a second group of solutions, wherein the first group of solutions is generated according to heuristic rules and wherein the second group of solutions is generated using a random process; and combining the first group of solutions and the second group of solutions to form the generated population of solutions.

34. The system of claim 25, wherein the input data is retrieved from a pipeline status database that stores a current operational state of the pipeline system.

35. A computer-implemented method of optimizing operations of a pipeline system, comprising:

a) generating, using a computer, an optimized production solution for a production of material supplied to the pipeline system using a genetic algorithm optimization technique to optimize a population of seed solutions; and b) generating, using the computer, an optimized pressure solution specifying an output pressure present at one or more delivery points of the pipeline system and an input pressure to generate at one or more production nodes of the pipeline system, for the generated optimized production solution using a direct pressure optimization technique to change pressures of some pipeline elements, wherein the direct pressure optimization is performed by:

calculating flows thorough a plurality of elements and nodes of the pipeline system;

determining and propagating pressures at the plurality of nodes;

generating a pressure dependency graph and using it to compute generalized pressure gap and minimum pressure for each sub network;

reducing pressures of high pressure nodes where possible;

propagating the pressures through the nodes of each sub network; and recalculating at least one unknown parameter of the elements of each sub network.

36. The method of claim 35, wherein the output pressures are within a required minimal delivery pressure for each respective delivery point and wherein the input pressures are within a maximal input pressure allowed for each respective production node of the pipeline system.

37. The method of claim 35, wherein generating an optimized production solution for the production of material included in the pipeline system, comprises:

a) reading input data, wherein the input data describes the pipeline system to be optimized;

b) generating a population of solutions, wherein each solution in the population specifies a feasible operational state for the pipeline system;

c) evaluating an expected performance of each solution in the population and sorting the solutions in the population according to the evaluation;

d) performing a genetic algorithm optimization process on the population until a termination condition specified by the input data is satisfied, whereby a plurality of optimized production solutions is selected; and e) after the genetic algorithm optimization process is performed, generating an optimized production solution from the selected plurality of optimized production solutions, wherein the generated optimized production solution has a highest evaluation, relative to the evaluations of other solutions in the population.

38. The method of claim 37, wherein performing the genetic algorithm optimization technique comprises:

a) modifying at least one solution in the population by modifying at least one aspect of the feasible operational state specified by the at least one solution;

b) simulating the operation of the pipeline system, according to the feasible operational state specified by the modified solution;

c) evaluating an expected performance of the modified solution;

d) adding the modified solution to the population; and e) removing a solution from the population with a poorest evaluation, relative to the evaluations of other solutions in the population.

39. The method of claim 38, wherein modifying the at least one aspect of the at least one solution in the population, comprises:

a) selecting a solution modification technique;

b) selecting the at least one solution from the population to modify; and c) modifying the at least one solution, according to the selected solution modification technique, wherein the selected solution modification technique either randomly modifies the least one aspect of the feasible operational state specified by the at least one solution or modifies the at least one solution according to a heuristic rule or cross-breeds two or more solutions to generate the modified solution.

* * * * *